(12) United States Patent
Wang et al.

(10) Patent No.: US 11,977,320 B2
(45) Date of Patent: May 7, 2024

(54) CAMERA MODULE AND ELECTRONIC DEVICE

(71) Applicant: Huawei Technologies Co., Ltd., Guangdong (CN)

(72) Inventors: Gang Wang, Dongguan (CN); Xin Li, Shenzhen (CN); Wei Tang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 167 days.

(21) Appl. No.: 17/780,683

(22) PCT Filed: Nov. 26, 2020

(86) PCT No.: PCT/CN2020/131928
§ 371 (c)(1),
(2) Date: May 27, 2022

(87) PCT Pub. No.: WO2021/104402
PCT Pub. Date: Jun. 3, 2021

(65) Prior Publication Data
US 2023/0229060 A1    Jul. 20, 2023

(30) Foreign Application Priority Data

Nov. 29, 2019  (CN) .......................... 201911204819.9

(51) Int. Cl.
*G03B 13/36* (2021.01)
*G02B 7/09* (2021.01)
(52) U.S. Cl.
CPC ............... *G03B 13/36* (2013.01); *G02B 7/09* (2013.01)

(58) Field of Classification Search
CPC .......... G03B 13/36; G02B 7/09; H04N 23/54; H04N 23/67; H04N 23/687; H04N 23/50;
(Continued)

(56) References Cited

U.S. PATENT DOCUMENTS

2013/0002933 A1\* 1/2013 Topliss ................. H04N 23/687
310/306
2014/0009675 A1   1/2014 Chiu
(Continued)

FOREIGN PATENT DOCUMENTS

CN      102207603 A    10/2011
CN      104635404 A    5/2015
(Continued)

*Primary Examiner* — Kelly L Jerabek
(74) *Attorney, Agent, or Firm* — WOMBLE BOND DICKINSON (US) LLP

(57) ABSTRACT

This application provides a camera module and an electronic device, to reduce manufacturing costs of the camera module and improve reliability of the camera module on the premise of ensuring optical image stabilization and auto-focus functions. The camera module includes a housing, and a light transfer part, a lens group, an image sensor, and a motor disposed in the housing. The image sensor is located on the side of the light output side. The motor includes a bracket, a carrier, and eight wires. Two ends of the wires are respectively connected to the carrier and the bracket, and the wires are retractable in length. The carrier is suspended from the bracket using the eight wires and is configured to carry the lens group, and, when the wires extend or retracts in length, drive the lens group to translate or rotate.

20 Claims, 21 Drawing Sheets

(58) Field of Classification Search
CPC ........ H04N 23/51; H04N 23/57; H04N 23/55; H04M 1/0264
See application file for complete search history.

(56) References Cited

U.S. PATENT DOCUMENTS

| | | | |
|---|---|---|---|
| 2018/0149142 A1 | 5/2018 | Bunting et al. | |
| 2018/0171991 A1* | 6/2018 | Miller | G02B 27/646 |
| 2018/0348593 A1 | 12/2018 | Brown | |
| 2018/0367714 A1 | 12/2018 | Im et al. | |
| 2018/0376042 A1 | 12/2018 | Kim et al. | |
| 2019/0120214 A1 | 4/2019 | Brown et al. | |
| 2019/0235202 A1 | 8/2019 | Smyth et al. | |
| 2021/0294068 A1* | 9/2021 | Que | F03G 7/0636 |
| 2021/0325630 A1* | 10/2021 | Yang | G02B 7/021 |

FOREIGN PATENT DOCUMENTS

| | | |
|---|---|---|
| CN | 106537252 A | 3/2017 |
| CN | 107493409 A | 12/2017 |
| CN | 108989641 A | 12/2018 |
| CN | 109061829 A | 12/2018 |
| CN | 109901346 A | 6/2019 |
| CN | 109951623 A | 6/2019 |
| CN | 109960001 A | 7/2019 |
| CN | 209642802 U | 11/2019 |
| EP | 3411741 A1 | 12/2018 |
| WO | 2007141937 A1 | 12/2007 |
| WO | 2017134456 A1 | 8/2017 |
| WO | 2019034860 A1 | 2/2019 |

* cited by examiner

CAMERA MODULE AND ELECTRONIC DEVICE

CROSS-REFERENCE TO RELATED APPLICATIONS

This application is a national stage of International Application No. PCT/CN2020/131928, filed on Nov. 26, 2020, which claims priority to Chinese Patent Application No. 201911204819.9, filed with the China National Intellectual Property Administration on Nov. 29, 2019, the entire contents of each of which are incorporated herein by reference in their entirety.

TECHNICAL FIELD

This application relates to the field of electronic device technologies, and in particular, to a camera module and an electronic device.

BACKGROUND

To enhance competitiveness of electronic devices such as mobile phones and tablet computers, integrated long-focus camera modules have become one of main development trends of the current electronic devices. A focal length of the long-focus camera module is relatively large, and a corresponding optical system requires longer structural space in a direction of an optical axis. Therefore, when the long-focus camera module is applied to an electronic device with a relatively small size, such as a mobile phone, the long-focus camera module is usually designed as a periscope structure to avoid increasing the thickness of the electronic device. For a periscope camera module, a plurality of voice coil motors may be configured to implement auto-focus and optical image stabilization functions. However, due to a limitation of an internal mounting space of the electronic device on an overall size of the module, design of the voice coil motor is also greatly limited to. This affects focusing and image stabilization effects of the camera module. In addition, the configuration of the plurality of voice coil motors not only increases manufacturing costs of the camera module, but also increases a failure probability of the camera module, consequently reducing reliability of the camera module.

SUMMARY

This application provides a camera module and an electronic device, to reduce manufacturing costs of the camera module and improve reliability of the camera module on the premise of ensuring optical image stabilization and auto-focus functions.

According to a first aspect, this application provides a camera module. The camera module includes a housing, and a light transfer part, a lens group, an image sensor, and a motor disposed in the housing. The housing is provided with a light inlet. The lens group is located between the light transfer part and the image sensor, and the lens group includes a light input side and a light output side whose positions are opposite to each other. The light transfer part is located on the side of the light input side of the lens group, and the light transfer part is further disposed at the light inlet, to redirect a light ray incident through the light inlet to enter the light input side of the lens group. The image sensor is located on the side of the light output side of the lens group, so that a light ray emitted from the light output side can be projected onto the image sensor for imaging. The motor may be configured to drive the lens group to move, so as to adjust a distance between the lens group and the image sensor or adjust an imaging position on a surface of the image sensor. In some embodiments, the motor may include a bracket, a carrier, and eight wires. Two ends of the wire are respectively connected to the carrier and the bracket, and the wire is retractable in the length. The carrier is suspended from the bracket through the eight wires, and the carrier may be configured to: carry the lens group, and when the wire extends or retracts, drive the lens group to translate or rotate, so as to adjust a position of the lens group relative to the image sensor, and further adjust the distance between the lens group and the image sensor or adjust the imaging position on the surface of the image sensor.

In the foregoing solution, the distance between the lens group and the image sensor or the imaging position on the surface of the image sensor may be adjusted by driving the lens group by the motor to translate or rotate, so that the camera module can implement both an auto-focus function and an optical image stabilization function. In other words, a three-axis image stabilization function may be implemented by using one motor. Therefore, an overall structure of the camera module can be simplified, and manufacturing costs of the camera module can be reduced. In addition, because the structure of the camera module is simplified, a risk of failure can also be reduced.

During connection of the wires to the carrier and the bracket, each wire may include a first end and a second end. The first end is connected to the carrier, and the second end is connected to the bracket. To improve reliability of the connection between the wires and the carrier, the motor may further include a fixing sheet for connecting the first end of the wire to the carrier, so as to improve strength of the connection between the wires and the carrier by using the fixing sheet. Certainly, in other implementation solutions, the second end of the wire may also be connected to the bracket by using a fixing sheet, so as to improve strength of connection between the wire and the bracket.

In some embodiments of the carrier, the carrier may have a hexahedral structure and include a first surface and a second surface opposite to each other, and a third surface, a fourth surface, a fifth surface, and a sixth surface that are connected between the first surface and the second surface. The third surface is opposite to the fifth surface, and the fourth surface is opposite to the sixth surface. The third surface intersects with the fourth surface at a first edge, and the fifth surface intersects with the sixth surface at a second edge. The first surface is disposed facing the light transfer part, and the second surface is disposed facing the image sensor. A passage passing through the first surface and then the second surface is disposed on the carrier, and the lens group may be disposed in the passage. During connection of the wires to the carrier, the eight wires may be divided in pairs into four groups, and the four groups of wires are respectively connected to the third surface, the fourth surface, the fifth surface, and the sixth surface, so that forces applied to the carrier can be relatively balanced, and the carrier can be reliably suspended from the bracket.

In some embodiments, the bracket may include two parts: a first bracket and a second bracket. The first bracket is disposed on the side of the fourth surface, and the second bracket is disposed on the side of the sixth surface. An arrangement direction of the third surface and the fifth surface is used as a first direction. The first bracket may include a first sidewall and a second sidewall, the first sidewall is disposed opposite to the fourth surface, and the second sidewall is an end sidewall that goes beyond the fifth surface in the first direction. The second bracket includes a third sidewall and a fourth sidewall, positions of the third sidewall and the sixth surface are opposite to each other, and the fourth sidewall is an end sidewall that goes beyond the third surface in the first direction. In this solution, on the premise that structural reliability of the motor is ensured, a structure of the bracket is relatively simple and a volume is relatively small, thereby helping reduce an overall volume and weight of the camera module.

In some embodiments of the eight wires, the eight wires are respectively a first wire, a second wire, a third wire, a fourth wire, a fifth wire, a sixth wire, a seventh wire, and an eighth wire as follows:

First ends of the first wire and the second wire are separately connected to positions on the third surface that are close to the first edge, second ends of the first wire and the second wire each are connected to the fourth sidewall, and projections of the first wire and the second wire onto the third surface cross each other.

First ends of the third wire and the fourth wire are separately connected to positions on the fifth surface that are close to the second edge, second ends of the third wire and the fourth wire each are connected to the second sidewall, and projections of the third wire and the fourth wire onto the fifth surface cross each other.

First ends of the fifth wire and the sixth wire are separately connected to positions on the fourth surface that are close to the first edge, second ends of the fifth wire and the sixth wire each are connected to the first sidewall, and projections of the fifth wire and the sixth wire onto the fourth surface cross each other.

First ends of the seventh wire and the eighth wire are separately connected to positions on the sixth surface that are close to the second edge, second ends of the seventh wire and the eighth wire each are connected to the third sidewall, and projections of the seventh wire and the eighth wire onto the sixth surface cross each other.

In the foregoing solution, each pair of the first and third wires, the second and fourth wires, the fifth and seventh wires, and the sixth and eighth wires uses a center of the carrier as a center of symmetry, and is disposed in a form of central symmetry. Resultant forces applied to the carrier are mutually balanced, so that the carrier can be reliably suspended between the first bracket and the second bracket through the eight wires.

To reduce difficulty of implementing retractable performance of the wire, in some embodiments, the eight wires each may be prepared from a shape-memory alloy. In addition, to facilitate control on a temperature of the wire, the camera module may further include a substrate, and a heating circuit may be disposed on the substrate. The wire may be connected to a corresponding heating circuit, so that the temperature of the wire can be controlled by controlling connection/disconnection of the heating circuit, so as to control a deformation status of the wire.

In some embodiments, the substrate may be disposed on a side that is of the image sensor and that is away from the lens group, and the image sensor may be electrically connected to the substrate through a metal wire, so as to transmit an electrical signal to a graphics processor or a central processing unit of an electronic device through the substrate, thereby implementing functions such as obtaining, converting, and processing an optical image.

To fix the motor in the housing, the camera module may further include a mounting base. The mounting base is located between the light transfer part and the image sensor, the mounting base is fixed in the housing, and the motor is fixed on the mounting base.

The mounting base may include a base and a cover plate, and the cover plate may be disposed on a side that is of the base and that is away from the image sensor, to form an accommodation space for accommodating the motor between the base and the cover plate. In addition, positions that are on the cover plate and the base and that correspond to the lens group each are provided with a through hole connected to the accommodation space, so that a light ray can smoothly pass through the lens group and then be projected onto the image sensor.

In a possible implementation solution, the camera module may further include a light filter. The light filter may be disposed between the light output side of the lens group and the image sensor for filtering infrared light in a light ray, thereby helping improve effective resolution and color reproduction of the image sensor, and making the imaging clearer and more stable.

When the light filter is fixed in the housing, the camera module may further include a support member. The support member is fixed on an inner wall of the housing, the light filter may be disposed on the side of the support member, and a light transmission hole is disposed on a position that is on the support member and that corresponds the image sensor.

In addition, to reduce a thickness of the light filter and the support member after being assembled, a counterbore may be disposed on the side of the support member. A diameter of the counterbore is greater than a diameter of the light transmission hole, to form an annular stepped structure between the counterbore and the light transmission hole. The light filter may be disposed on the annular stepped structure.

In some embodiments, the light transfer part may include a support frame and a prism. The support frame is fixed in the housing, and the support frame has a mounting surface. The prism may be fixed on the mounting surface. The prism includes a light input surface and a light output surface, the light input surface is disposed facing the light inlet, and the light output surface is disposed facing the light input side of the lens group.

In some embodiments, the light input surface and the light output surface of the prism may be disposed orthogonal to each other, that is, the prism may perform 90-degree redirection on a light ray. When a light incoming direction of the camera module is a thickness direction of the electronic device, devices such as the lens group, the light filter, and the image sensor may be arranged along a length direction or a width direction of the electronic device, to reduce a dimension of the camera module in the thickness direction of the electronic device.

To prevent the light transfer part from being shift caused due to, for example, impact on the electronic device, a limiting member may be further disposed in the housing, and the limiting member may abut against the support frame and limit the support frame.

In some embodiments, the support frame may be a triangular prism structure, and two edges that are on the support frame and that are adjacent to the mounting surface respectively have a first extension portion and a second extension portion. The limiting member may include a first limiting member and a second limiting member, the first limiting member abuts against the first extension portion, and the second limiting member abuts against the second extension portion.

To reduce weight of the support frame, in some embodiments, the support frame may alternatively be a plate-shaped structure, and the two ends of the support frame have a first extension portion and a second extension portion, respectively. The limiting member includes a first limiting member and a second limiting member, the first limiting member is in contact with the first extension portion, and the second limiting member is in contact with the second extension portion. Two ends of the support frame respectively have a first extension portion and a second extension portion. The limiting member includes a first limiting member and a second limiting member, the first limiting member abuts against the first extension portion, and the second limiting member abuts against the second extension portion.

According to a second aspect, this application further provides an electronic device. The electronic device includes a casing and the camera module according to any possible implementation solution of the first aspect. The camera module is disposed in the casing, and an opening is disposed at a position that is on the casing and that corresponds to a light inlet of the camera module. Because manufacturing costs and reliability risks of the camera module can be reduced, overall manufacturing costs of the electronic device can also be reduced, and overall performance can be improved.

According to a third aspect, this application further provides a camera module. The camera module includes a housing, and a light transfer part, a lens group, an image sensor, a motor, a first driving component, and a second driving component disposed in the housing. The housing is provided with a light inlet. The lens group is located between the light transfer part and the image sensor, and the lens group includes a light input side and a light output side. The light transfer part is located on the side of the light input side, and the light transfer part is further movably disposed at the light inlet, to redirect a light ray incident through the light inlet to enter the light input side of the lens group. The image sensor is located on the side of the light output side of the lens group, so that a light ray emitted from the light output side can be projected onto the image sensor for imaging. The motor may include a bracket, a carrier, and eight wires. Two ends of the wire are respectively connected to the carrier and the bracket, and the wire is retractable in the length. The carrier may be suspended from the bracket through the eight wires. The carrier may be configured to: carry the lens group, and when the wire extends or retracts, drive the lens group to translate, so as to adjust a distance between the lens group and the image sensor. The image stabilization motor is connected to the light transfer part and is configured to drive the light transfer part to translate or rotate, so as to adjust a propagation path of a light ray emitted from the light transfer part to the lens group.

In the foregoing solution, focusing and image stabilization functions of the camera module are respectively implemented by using the motor and the image stabilization motor. Therefore, an advantage of a large focusing stroke of the motor can be utilized, so that long-focus performance of the camera module can be improved. In addition, because a structure of the motor is simpler than that of a conventional voice coil motor, this solution can further simplify an overall structure of the camera module to some extent, thereby reducing the manufacturing costs of the camera module.

In some embodiments, the light transfer part may include a base body, a support frame, and a prism. The base body may be pivotally mounted on the housing through a first rotating shaft, and the support frame is pivotally mounted on the base body through a second rotating shaft. The prism is fixed on the support frame, and an extension direction of the first rotating shaft is perpendicular to an extension direction of the second rotating shaft. The image stabilization motor may include a first driving component and a second driving component. The first driving component may be configured to drive the base body to rotate around the first rotating shaft, and the second driving component may be configured to drive the base body to rotate around the second rotating shaft, so as to implement a dual-axis image stabilization function of the camera module.

According to a fourth aspect, this application further provides an electronic device. The electronic device includes a casing and the camera module according to any possible implementation solution of the third aspect. The camera module is disposed in the casing, and an opening is disposed at a position that is on the casing and that corresponds to a light inlet of the camera module. Because manufacturing costs of the camera module can be reduced, overall manufacturing costs of the electronic device can also be reduced.

REFERENCE NUMERALS

Figure 1A:
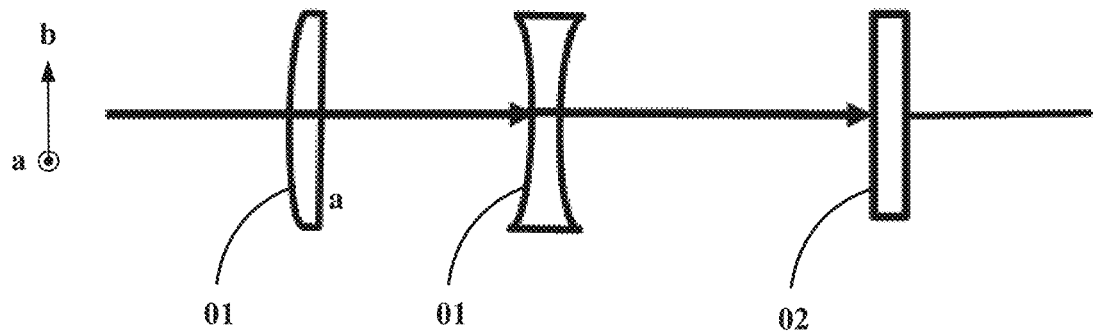
FIG. 1a is a schematic diagram of a relative position relationship between lenses and an image sensor during stable imaging.

01—lens; 02—image sensor; 03—light transfer part; 04—lens group; 05—image sensor; 06—first motor.

100: camera module; 10—housing; 20—light transfer part; 30—lens group; 40—light filter; 50—image sensor; 60—substrate; 11—light inlet; 12—aperture; 31—light input side; 32—light output side; 70—motor; 80—mounting base; 81—base;

82—cover plate; 83—accommodation space; 84—through hole; 41—support member; 42—light transmission hole; 43—counterbore; 44—annular stepped structure;

21—support frame; 22—prism; 221—light input surface; 222—light output surface; 211—mounting surface; 212—first extension portion;

213—second extension portion; 13—first limiting member; 14—second limiting member; 33—optical lens; 34—fixing base; 35—fixing groove;

71—carrier; 711—first surface; 712—second surface; 713—third surface; 714—fourth surface; 715—fourth surface; 716—sixth surface;

717—first edge; 718—second edge; 719—passage; 72—bracket; 721—first bracket; 722—second bracket;

723—first sidewall; 724—second sidewall; 725—third sidewall; 726—fourth sidewall; 701—first wire; 702—second wire;

703—third wire; 704—fourth wire; 705—fifth wire; 706—sixth wire; 707—seventh wire; 708—eighth wire;

73—fixing sheet; 90—image stabilization motor; 23—base body; 24—first rotating shaft; 25—second rotating shaft; 91—first driving component;

92—second driving component; 93—coil; 94—first magnet; 95—second magnet; 200—electronic device; 210—casing;

220—opening.

DESCRIPTION OF EMBODIMENTS

To make objectives, technical solutions, and advantages of this application clearer, the following further describes this application in detail with reference to the accompanying drawings.

To facilitate understanding of a camera module provided in embodiments of this application, the following first describes an application scenario of the camera module. The camera module provided in embodiments of this application may be applied to an electronic device, so that the electronic device implements functions such as image acquisition and video capture. The electronic device may be a common terminal such as a mobile phone, a tablet computer, or a notebook computer in the conventional technology. There are various types of cameras. For example, according to whether a focal length can be adjusted, the cameras may be classified into two categories: fixed-focus lenses and zoom lenses. The fixed-focus lens is widely used in electronic devices such as mobile phones due to a relatively simple structure. According to a magnitude of a fixed focal length, fixed focal lenses may be further classified into wide angle lenses, common lenses, and long-focus lenses. For the long-focus lens, because a focal length of the long-focus lens is relatively long, a corresponding optical system requires a longer structure space in an optical axis direction. If a conventional camera structure is used, a thickness of the mobile phone is inevitably increased, which contradicts a miniaturized and ultra-thin design trend of current mobile phones. To overcome this problem, a long-focus lens integrated in a current mobile phone usually uses a periscope structure.

In addition, because an angle of view of the long-focus lens is relatively small, even if the lens shakes slightly during shooting, definition of a captured image is obviously affected. Therefore, application of an optical image stabilization function in the long-focus lens is particularly important. An effect of optical image stabilization is to detect shaking of a mobile phone in specific frequency and amplitude ranges in real time during photographing, and perform reverse compensation based on a detection result. The compensation can be obtained by correcting an optical axis by using the lens. Therefore, a loss in picture quality is small, and image quality can be better ensured. Basic manners of the optical image stabilization may be classified into movable image stabilization and tilting image stabilization. The movable image stabilization is to adjust an imaging position on a surface of an image sensor by translating the lens, and the tilting image stabilization is to adjust an imaging position on a surface of an image sensor by rotating the lens.

Figure 1B:
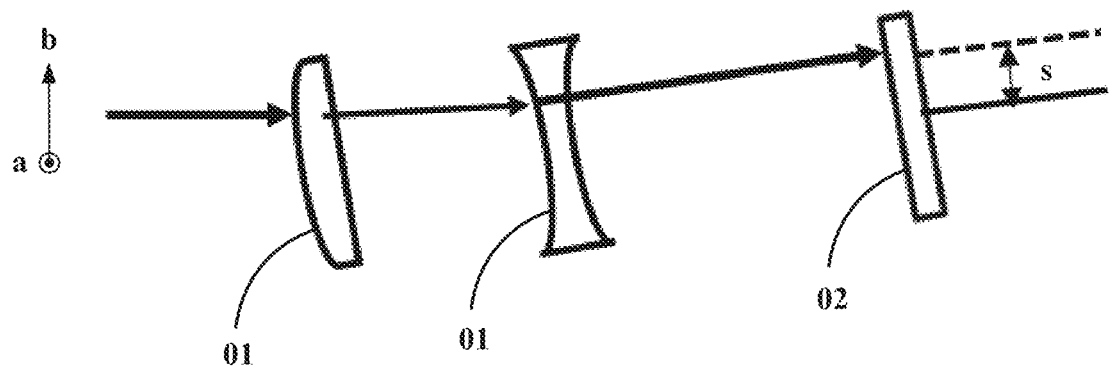
FIG. 1b is a schematic diagram of a relative position relationship between lenses and an image sensor when shaking exists.
Figure 1C:
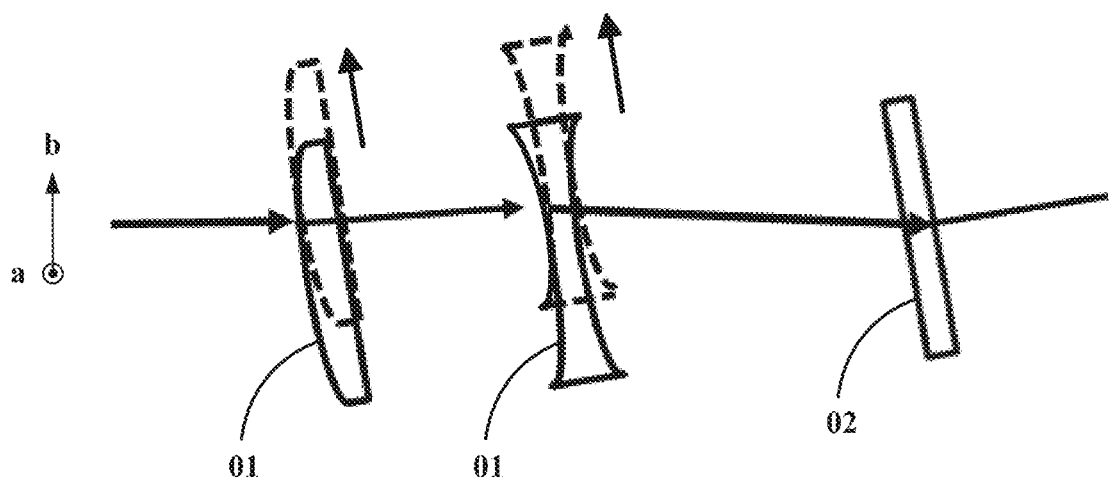
FIG. 1c is a schematic diagram of a relative position relationship between lenses and an image sensor when movable image stabilization is used.
Figure 1D:
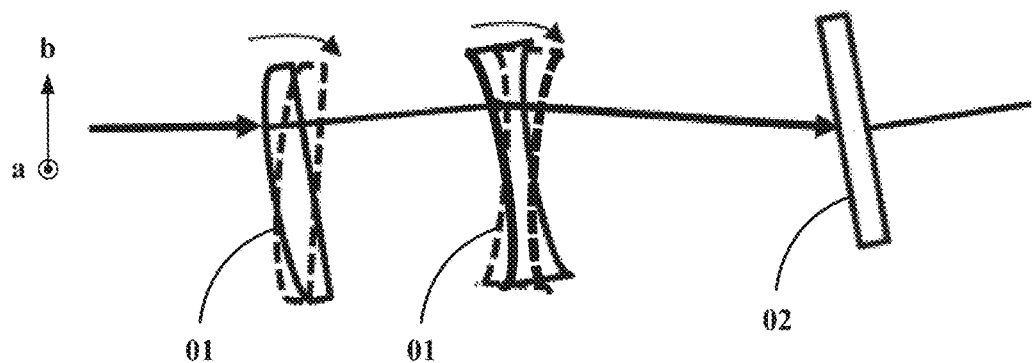
FIG. 1d is a schematic diagram of a relative position relationship between lenses and an image sensor when tilting image stabilization is used.

As shown in FIG. 1a to FIG. 1d, FIG. 1a is a schematic diagram of a relative position relationship between lenses 01 and an image sensor 02 during stable imaging. FIG. 1b is a schematic diagram of a relative position relationship between lenses 01 and an image sensor 02 when shaking exists. In this case, an optical path shifts, and an imaging position on a surface of the image sensor 02 also shifts by a distance s. FIG. 1c is a schematic diagram of a relative position relationship between lenses 01 and an image sensor 02 when movable image stabilization is used. In such an image stabilization manner, the lens 01 may be translated along two mutually perpendicular directions (such as the direction a and the direction b in the figure) parallel to a two-dimensional plane of the image sensor 02, to adjust an imaging position on a surface of the image sensor 02. The solid line shows the lens 01 before translation, and the dashed line shows the lens 02 after translation. FIG. 1c merely shows an example principle of compensating for an optical path shift by translating a lens 01 along the direction a. It should be understood that, a principle of compensating the optical path shift by shifting the lens 01 along the direction b is similar, and details are not described herein again. FIG. 1d is a schematic diagram of a relative position relationship between lenses 01 and an image sensor 02 when tilting image stabilization is used. In such an image stabilization manner, the lens 01 may rotate in two mutually perpendicular directions (such as the direction a and the direction b in the figure), to adjust an imaging position on a surface of the image sensor 02. The solid line shows the lens 01 before rotation, and the dashed line shows the lens 02 after rotation. FIG. 1d merely shows a principle of compensating for an optical path shift by rotating a lens 01 around the direction b. It should be understood that a principle of compensating for the optical path shift by rotating the lens 01 around the direction a is similar, and details are not described herein again.

Figure 2:
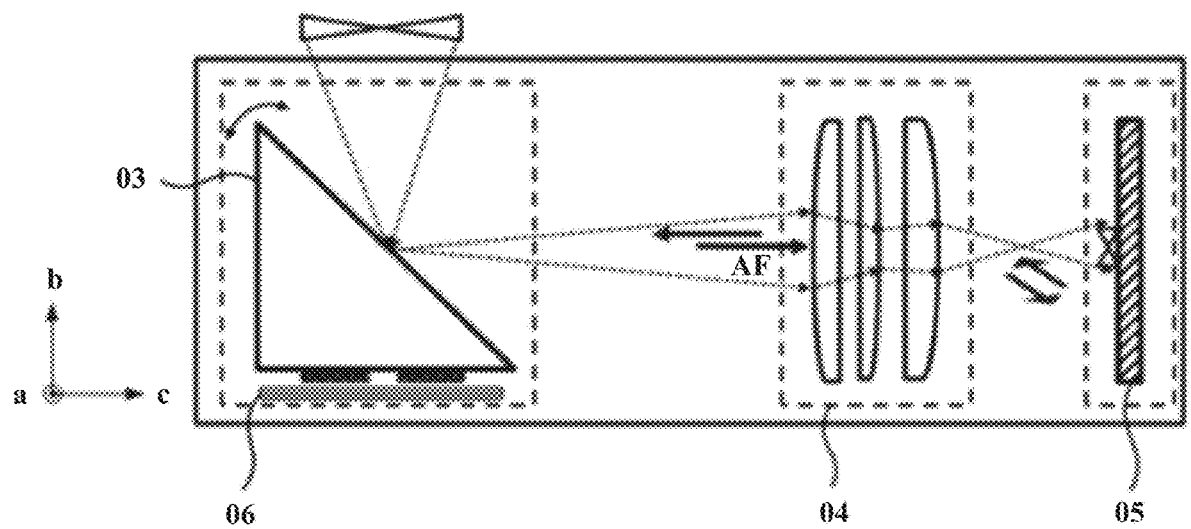
FIG. 2 is a schematic diagram of a structure of an existing periscope camera module.

Refer to FIG. 2. FIG. 2 is a schematic diagram of a structure of an existing periscope camera module. The camera module includes a light transfer part 03, a lens group 04, and an image sensor 05. The light transfer part 03 is located on the side of a light input side of the lens group 04 and is configured to redirect a light ray entering the camera module to enter the light input side of the lens group 04. The image sensor 05 is located on the side of a light output side of the lens group 04, so that a light ray emitted from the light output side of the lens group 04 can be projected onto the image sensor 05. When the camera module is applied to a mobile phone, the direction a in the figure is a width direction of the mobile phone, the direction b is a thickness direction of the mobile phone, and the direction c is a length direction of the mobile phone. Alternatively, the direction a is a length direction of the mobile phone, the direction b is a thickness direction of the mobile phone, and the direction c is a width direction of the mobile phone. Compared with a conventional camera module, this structure can reduce components distributed in the thickness direction of the mobile phone, so as to reduce a dimension in the thickness direction of the mobile phone, so that the camera module can be applied to a mobile phone with ultra-thin design.

The camera module further includes a first motor 06 and a second motor (not shown in the figure). The first motor 06 is configured to drive the light transfer part 03 to rotate around the axis a, so that the light transfer part 03 is shifted in a direction of the axis b to compensate for shaking in this direction, thereby implementing tilting image stabilization in the direction of the b-axis. The second motor is configured to drive the lens group 04 to move along a direction of the axis a, thereby implementing movable optical image stabilization in the direction of the axis a. In addition, the second motor may be further configured to drive the lens group 04 to move along a direction of the axis c, so that the camera module implements an auto-focus function. Both the first motor 06 and the second motor may use an electromagnetic driving manner. In some embodiments, the first motor 06 includes one magnet-coil structure for driving the light transfer part 03 to rotate, and the second motor includes two magnet-coil structures, to respectively drive the lens group 04 to move in the direction of the axis a and the direction of the axis c.

Therefore, in the camera module shown in FIG. 2, three magnet-coil structures are required to implement dual-axis optical image stabilization and auto-focus functions of the camera module. A size of the magnet-coil structure is relatively large, leading to a relatively large size of the entire camera module. Therefore, a mounting space inside the mobile phone occupied by the camera module is also increased. In other words, when the size of the camera module is fixed, design of the first motor/second motor is greatly limited, which limits rotation of the image sensor or displacement of the lens group, thereby affecting a final imaging effect. In addition, using three magnet-coil structures not only increases manufacturing costs of the camera module, but also increases reliability risks of the camera module.

Based on this, an embodiment of this application provides a camera module. The camera module can reduce manufacturing costs of the camera module and improve reliability of the camera module on the premise of ensuring optical image stabilization and auto-focus functions.

Figure 3:
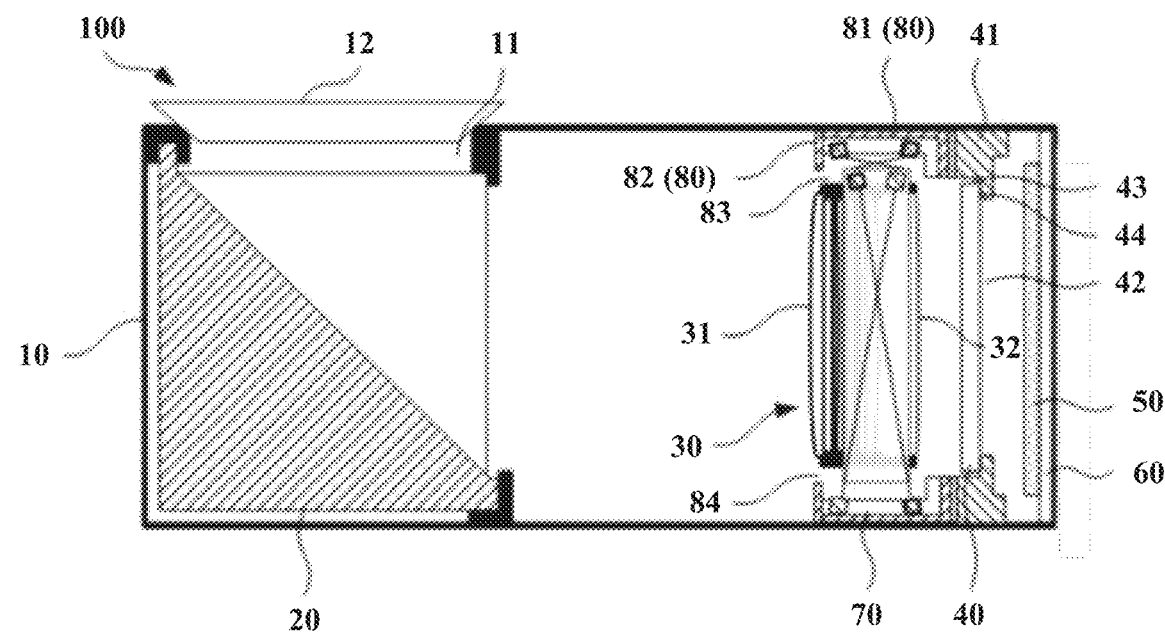
FIG. 3 is a schematic diagram of a structure of a camera module according to an embodiment of this application.

First, refer to FIG. 3. FIG. 3 is a schematic diagram of a structure of a camera module according to an embodiment of this application. The camera module 100 includes a housing 10, and a light transfer part 20, a lens group 30, a light filter 40, an image sensor 50, and a substrate 60 disposed in the housing 10. The housing 10 is provided with a light inlet 11. An aperture 12 configured to guide a light ray into the housing 10 is disposed at the light inlet 11. The light transfer part 20 may be configured to redirect a propagation path of a light ray. In some embodiments, the light transfer part 20 may be disposed at the light inlet 11, and the light transfer part 20 is further located on the side of a light input side 31 of the lens group 30, to redirect a light ray incident through the light inlet 11 to enter the light input side 31 of the lens group 30. The light filter 40 and the image sensor 50 each are disposed on the side of a light output side 32 of the lens group 30, and the light filter 40 is located between the lens group 30 and the image sensor 50, so that a light ray emitted from the light output side 32 of the lens group 30 can be projected onto the image sensor 50 after being subjected to a light filtering function of the light-filtering plate 40. A substrate 60 is located on a side that is of the image sensor 50 and that is away from the light filter 40, and the image sensor 50 is fixed to the substrate 60 and electrically connected to the substrate 60.

In addition, to improve an imaging effect of the camera module 100, in this embodiment of this application, the camera module 100 may further include a motor 70 fixedly connected to the lens group 30. The motor 70 may drive the lens group 30 to move, so as to adjust a distance between the lens group 30 and the image sensor 50 or adjust an imaging position on a surface of the image sensor 50, so that the camera module can implement both the auto-focus function and the optical image stabilization function. In some embodiments, the lens group 30 may be disposed on the motor 70, and the motor 70 may be fixed in the housing 10 by using the mounting base 80. The mounting base 80 may include a base 81 and a cover plate 82. The cover plate 82 is disposed on a side that is of the base 81 and that is away from the light filter 40, and an accommodation space 83 for accommodating the motor 70 is formed between the cover plate 82 and the base 81. The motor 70 is disposed in the accommodation space 83. In addition, positions that are on the cover plate 82 and the base 81 and that correspond to the lens group 30 each are provided with a through hole 84 connected to the accommodation space 83, so that a light ray can smoothly pass through the lens group 30 and then be projected onto the image sensor 50.

The light filter 40 in this embodiment of this application may be configured to filter infrared light in a light ray, to suppress passage of a light wave having a spatial frequency higher than that of the image sensor 50, thereby preventing ripple disturbance, improving effective resolution and color reproduction of the image sensor 50, and making imaging clearer and more stable. When the light filter 40 is fixed in the housing 10, the camera module may further include a support member 41 configured to support the light filter 40. In some embodiments, the light filter 40 may be fixed on the side of the support member 41 in a manner such as bonding. The support member 41 may be fixed to an inner wall of the housing 10 in a manner such as an interference fit. A light transmission hole 42 is disposed on a position that is on the support member 41 and that corresponds to the image sensor 50, so that a light ray can be smoothly emitted into the image sensor 50. In addition, refer to FIG. 3. When the light filter 40 is disposed on a side that is of the support member 41 and that faces the lens group 30, a counterbore 43 may be further disposed on the side that is of the support member 41 and that faces the lens group 30. A diameter of the counterbore 43 may be slightly greater than a diameter of the light transmission hole 42, to form an annular stepped structure 44 between the counterbore 43 and the light transmission hole 42. The light filter 40 may be disposed on the annular stepped structure 44, to reduce a thickness of the light filter 40 and the support member 41 after being assembled, thereby helping reduce an overall size of the camera module.

It can be understood that, in other embodiments of this application, the light filter may alternatively be disposed on a side that is of the support member and that faces the image sensor. In this case, a counterbore may be disposed on the side that is of the support member and that faces the image sensor, to form an annular stepped structure for arrangement of the light filter on the side that is of the support member and that faces the image sensor.

In this embodiment of this application, the substrate 60 may be used as a separate component in the camera module. In this case, the substrate 60 and a main board of an electronic device may be electrically connected through a device such as a connector. Certainly, in other embodiments of this application, the substrate 60 may alternatively be used as a main board of the electronic device. In this case, a processor, a plurality of chips, and the like that are configured to support running of various functions of the electronic device may be further disposed on the substrate 60. The image sensor 50 may be a CMOS (complementary metal-oxide semiconductor) image sensor device, or a CCD (charge coupled device) image sensor device and may be configured to perform photoelectric conversion and A/D (analog signal/digital signal) conversion on an optical signal of an incident light ray. The image sensor 50 and the substrate 60 may be electrically connected through a metal wire, to transmit a converted electrical signal to a graphics processor or a central processing unit of the electronic device through the substrate, thereby implementing functions such as obtaining, converting, and processing an optical image.

Figure 4:
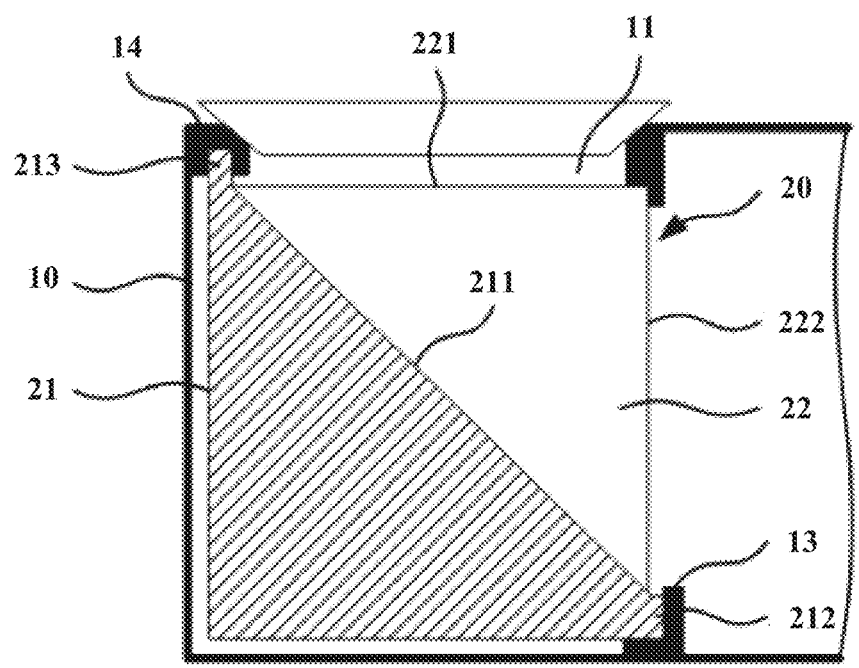
FIG. 4 is a schematic diagram of a structure of a light transfer part according to an embodiment of this application.

FIG. 4 is a schematic diagram of a structure of a light transfer part according to an embodiment of this application. The light transfer part 20 may include a support frame 21 and a prism 22, and the prism 22 may be fixed to the support frame 21 in a manner such as bonding. The prism 22 has a light input surface 221 and a light output surface 222, the light input surface 221 is disposed facing a light inlet 11, and the light output surface 222 is disposed facing a light input side of a lens group. A light ray may enter the prism 22 from the light input surface 221, and exit from the light output surface 222 after being reflected by prism 22. A redirection angle of the prism 22 for a light ray may be between 0 and 180 degrees. For example, in an embodiment of this application, the prism 22 may redirect a light ray by 90 degrees. In this case, the prism 22 may be a right-angle prism. The light input surface 221 and the light output surface 222 are perpendicular to each other. Certainly, the redirection angle of the prism 22 for a light ray may alternatively be another angle, for example, 80 degrees or 100 degrees. This is not limited in this application, provided that a redirected light ray can be emitted into the lens group.

During arrangement of the support frame 21, the support frame 21 has an inclined mounting surface 211, and the prism 22 can be fixed to the mounting surface 211. In an embodiment of this application, the support frame 21 may be in a triangular prism shape, and when the support frame 21 in the triangular prism shape is fixed in the housing 10, two edges of the support frame 21 that are close to the prism 22 may respectively have a first extension portion 212 and a second extension portion 213. A first limiting member 13 disposed corresponding to the first extension portion 212 and a second limiting member 14 disposed corresponding to the second extension portion 213 are disposed in the housing 10. The two limiting members may limit the support frame 21 respectively by abutting against or clamping the two extension portions, to prevent a shift of the light transfer part 20 caused due to, for example, impact on the electronic device. This helps improve imaging quality of the camera module. In some embodiments, refer to FIG. 4. The first limiting member 13 may be an L-shaped structure, and the second limiting member 14 may be a concave structure. The first extension portion 212 abuts against and is disposed on the first limiting member 13, and the second extension portion 213 is clamped into the second limiting member 14.

Figure 5:
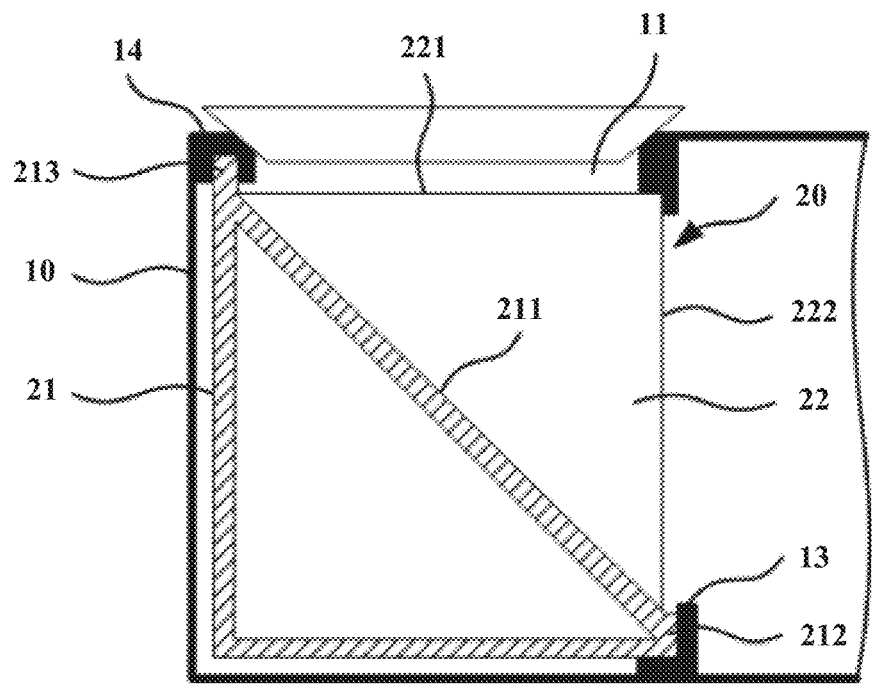
FIG. 5 is a schematic diagram of a structure of a light transfer part according to another embodiment of this application.

Refer to FIG. 5. In another embodiment of this application, the support frame 21 may be further designed as a hollow structure, to reduce weight of the support frame 21, thereby reducing overall weight of the camera module.

Figure 6:
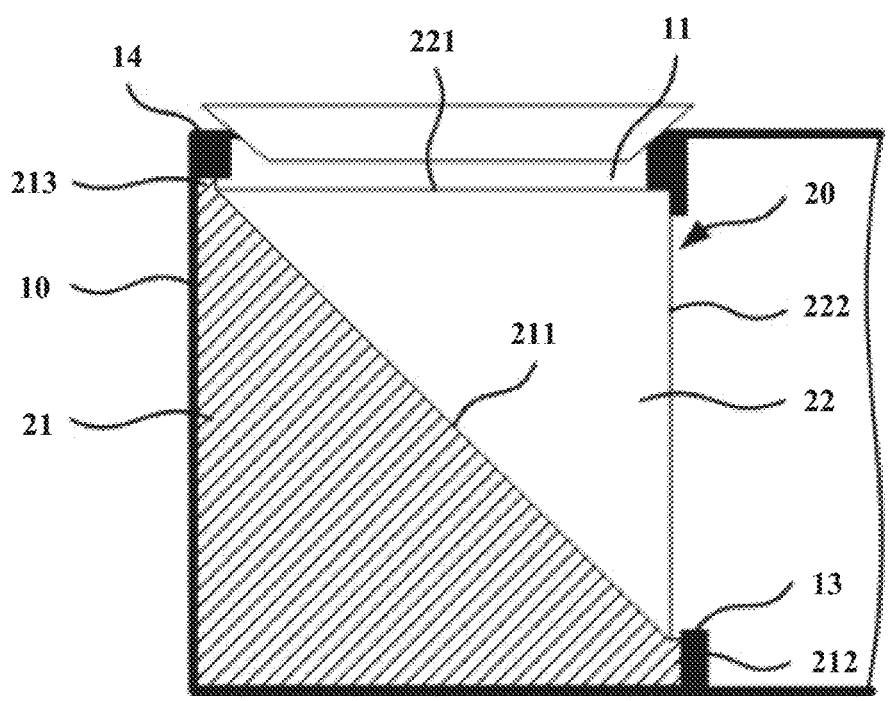
FIG. 6 is a schematic diagram of a structure of a light transfer part according to still another embodiment of this application.

FIG. 6 is a schematic diagram of a structure of a light transfer part according to still another embodiment of this application. As shown in FIG. 6, the support frame 21 may be embedded in the housing 10. To be specific, two side surfaces of the support frame 21 other than the mounting surface 211 are respectively in contact with inner walls of the housing 10, so that mounting reliability of the support frame 21 can be improved, thereby improving overall structural strength of the light transfer part. In some embodiments, the first limiting member 13 and the second limiting member 14 each are a block-shaped structure, the first limiting member 13 abuts against an end part of a first extension portion 212, and the second limiting member 14 abuts against an end part of a second extension portion 213.

Figure 7:
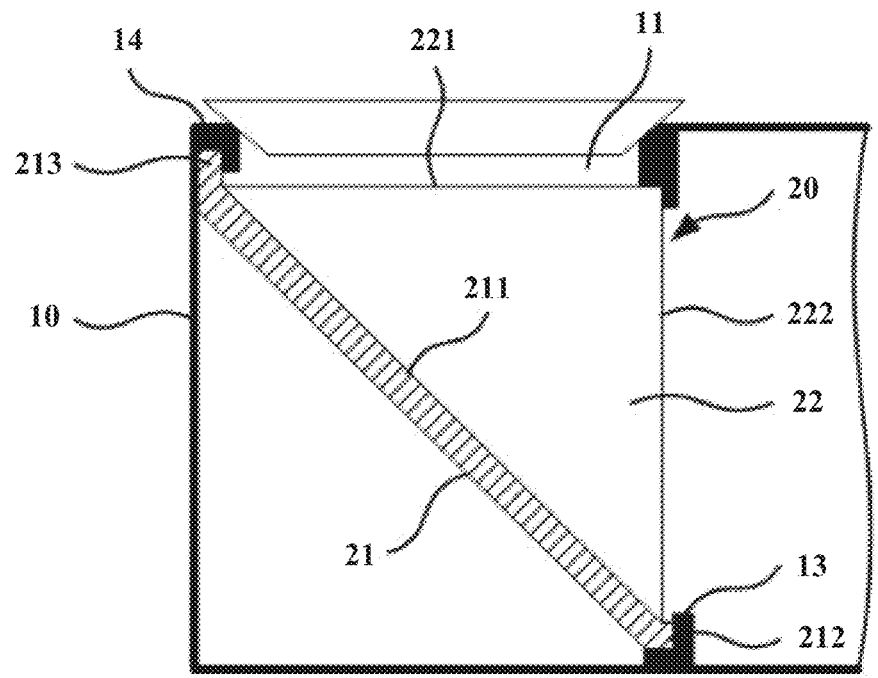
FIG. 7 is a schematic diagram of a structure of a light transfer part according to yet another embodiment of this application.

FIG. 7 is a schematic diagram of a structure of a light transfer part according to yet another embodiment of this application. As shown in FIG. 7, in this embodiment of this application, the support frame 21 may be a plate-shaped structure. This helps reduce weight of the support frame 21, thereby reducing overall weight of the camera module. When the support frame 21 of the plate-shaped structure is fixed in a housing 10, similarly, two ends of the support frame 21 may also be respectively provided with a first extension portion 212 and a second extension portion 213.

A first limiting member 13 and a second limiting member 14 are correspondingly disposed in the housing 10. The limiting members may limit the support frame 21 by abutting against or clamping the extension portions. A specific implementation is similar to that in the foregoing embodiment, and details are not described herein again.

Figure 8:
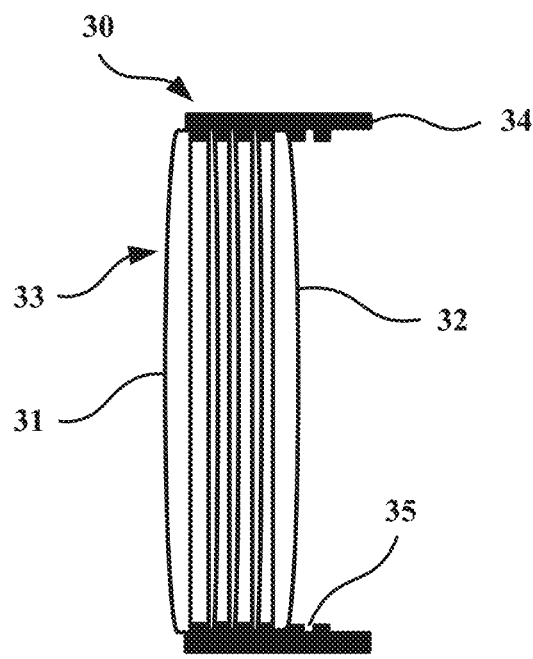
FIG. 8 is a schematic diagram of a structure of a lens group according to an embodiment of this application.

FIG. 8 is a schematic diagram of a structure of a lens group according to an embodiment of this application. The lens group 30 may be configured to converge light rays entering the light input side 31 and project them to the image sensor. In some embodiments, the lens group 30 may include a plurality of coaxially disposed optical lenses 33 and a fixing base 34 for mounting the optical lenses 33. Fixing grooves 35 in one-to-one correspondence with the optical lenses 33 may be disposed on the fixing base 34, so that the plurality of optical lenses 33 may be fixed in corresponding fixing grooves 35 at intervals.

In some embodiments of the motor, the motor may include a carrier, a bracket and eight wires for connecting the bracket and the carrier. The carrier may be configured to carry and fix the lens group, and the bracket may be configured to fix the motor on a mounting base, so that the motor and the lens group are fixed in the housing by using the mounting base. The following describes a structure of the motor in detail.

Figure 9:
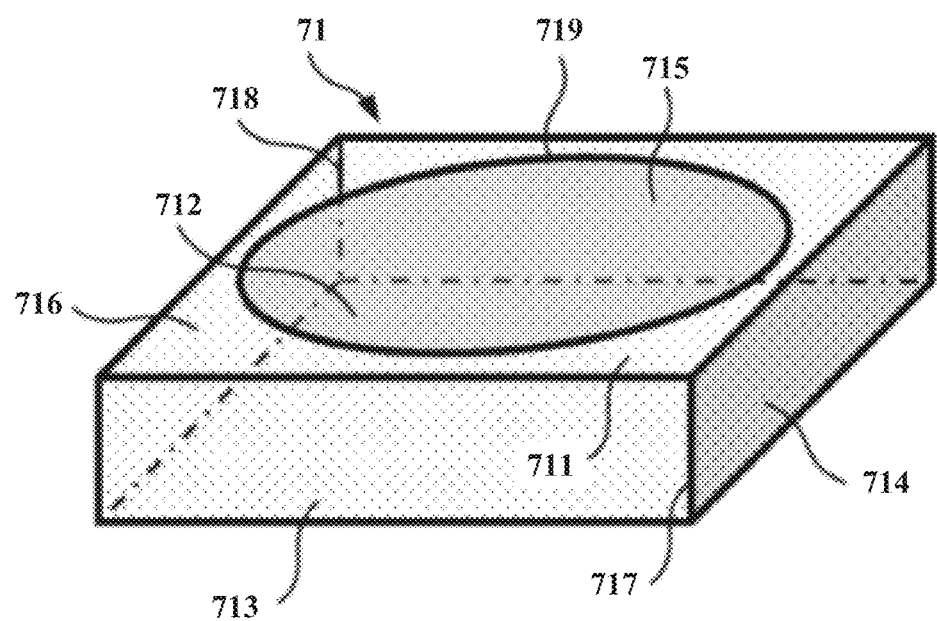
FIG. 9 is a schematic diagram of a structure of a carrier according to an embodiment of this application.

FIG. 9 is a schematic diagram of a structure of a carrier according to an embodiment of this application. In this embodiment of this application, the carrier 71 may have a hexahedral structure, including a first surface 711 and a second surface 712 opposite to each other, and a third surface 713, a fourth surface 714, a fifth surface 715, and a sixth surface 716 that are connected between the first surface 711 and the second surface 712. The third surface 713 is disposed opposite to the fifth surface 715, and the fourth surface 714 is disposed opposite to the sixth surface 716. The third surface 713 intersects with the fourth surface 714 at a first edge 717, and the fifth surface 715 intersects with the sixth surface 716 at a second edge 718. For ease of description, in the following, an arrangement direction of the third surface 713 and the fifth surface 715 is referred to as a first direction, an arrangement direction of the fourth surface and the sixth surface is referred to as a second direction, and an arrangement direction of the first surface and the second surface is referred to as a third direction. The carrier 71 is provided with a passage 719 that is disposed along the third direction and that passes through the first surface 711 and then the second surface 712. The lens group may be disposed in the passage 719.

When the camera module is applied to an electronic device, the first direction may be a width direction of the electronic device, the second direction may be a thickness direction of the electronic device, and the third direction may be a length direction of the electronic device. Alternatively, the first direction may be a length direction of the electronic device, the second direction may be a thickness direction of the electronic device, and the third direction may be a width direction of the electronic device.

Figure 10:
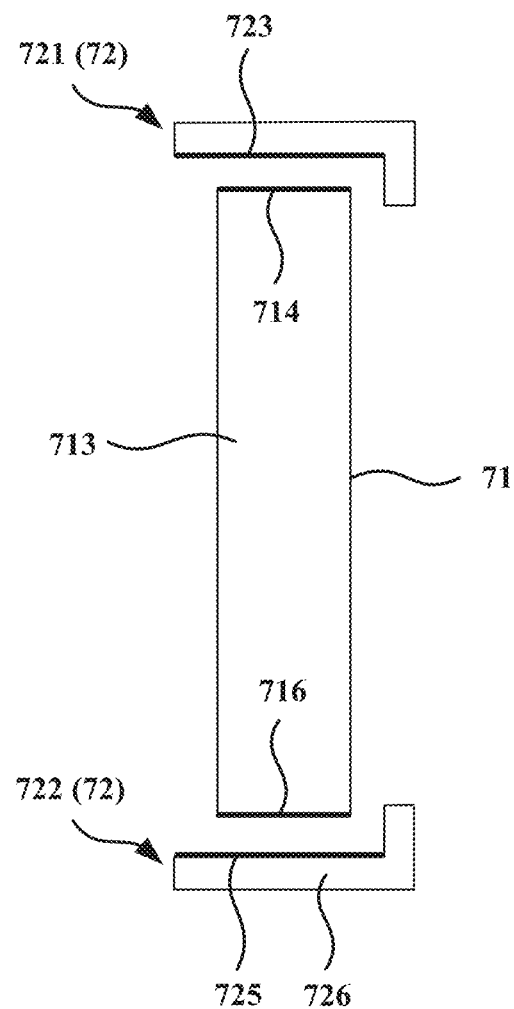
FIG. 10 is a schematic diagram of a relative position relationship between a bracket and a carrier in a main view direction according to an embodiment of this application.
Figure 11:
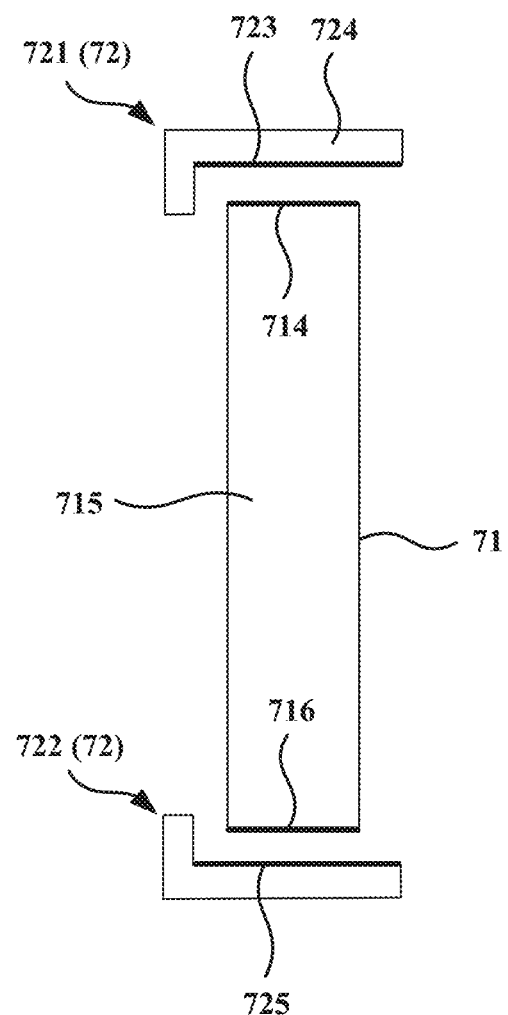
FIG. 11 is a schematic diagram of a relative position relationship between a bracket and a carrier in a rear view direction according to an embodiment of this application.

Refer to FIG. 10 and FIG. 11. FIG. 10 is a schematic diagram of a relative position relationship between a bracket and a carrier in a main view direction. FIG. 11 is a schematic diagram of a relative position relationship between a bracket and a carrier in a rear view direction. In an embodiment of this application, the bracket 72 may include a first bracket 721 and a second bracket 722. The first bracket 721 is disposed on the side of the fourth surface 714, and the second bracket 722 is disposed on the side of the sixth surface 716. Specific structural forms of the first bracket 721 and the second bracket 722 are not limited. For example, cross sections, perpendicular to the first direction, of the first bracket 721 and the second bracket 722 may be designed to be L-shaped, and the carrier 71 is disposed between the first bracket 721 and the second bracket 722.

In some embodiments, at least one end of the first bracket 721 in the first direction extends beyond the carrier 71, and at least one end of the second bracket 722 in the first direction extends beyond the carrier 71. The first bracket 721 includes a first sidewall 723 and a second sidewall 724. The first sidewall 723 is disposed corresponding to the fourth surface 714 of the carrier 71, and the second sidewall 724 is an end sidewall that goes beyond the fifth surface 715 of the carrier in the first direction. The second bracket 722 includes a third sidewall 725 and a fourth sidewall 726. The third sidewall 725 is disposed corresponding to the sixth surface 716, and the fourth sidewall 726 is an end sidewall that goes beyond the third surface 713 of the carrier 71 in the first direction.

As described above, the carrier and the bracket can be connected through eight wires. The eight wires are specifically a first wire, a second wire, a third wire, a fourth wire, a fifth wire, a sixth wire, a seventh wire, and an eighth wire. Each wire may include a first end and a second end. The first end may be configured to connect to the carrier, and the second end may be configured to connect to the bracket. In some embodiments, the carrier may be suspended between the first bracket and the second bracket through the eight wires. "Suspended" herein may be understood as follows: There is no direct contact between the carrier and the bracket, and the carrier can move relative to the bracket. Arrangement manners of the eight wires are described in detail below.

Figure 12:
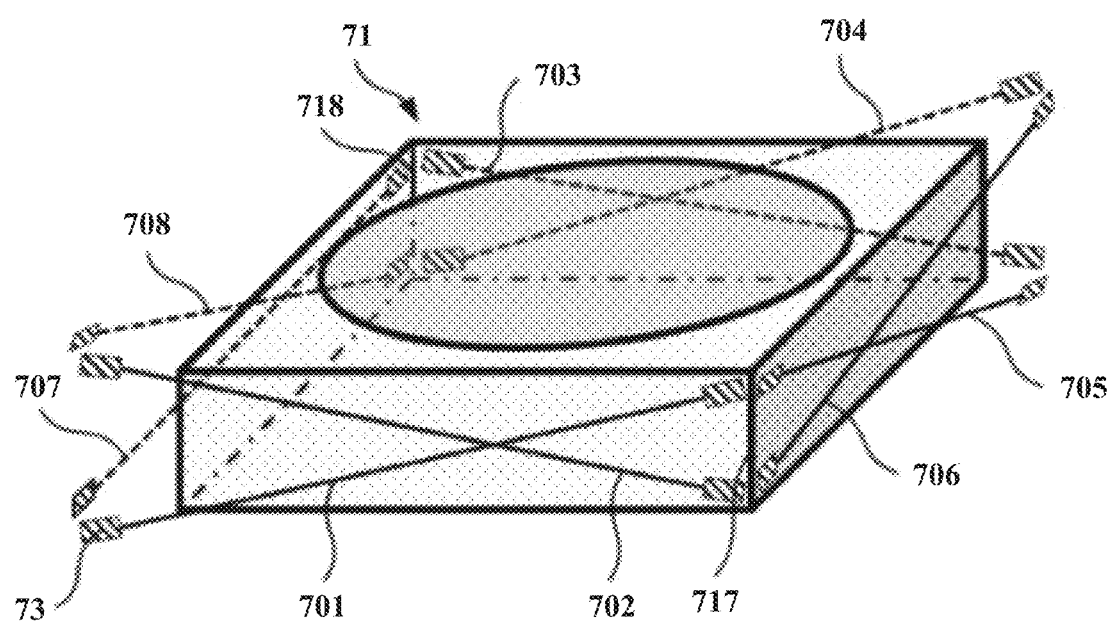
FIG. 12 is a schematic diagram of a manner of connection between a carrier and eight wires according to an embodiment of this application.
Figure 13:
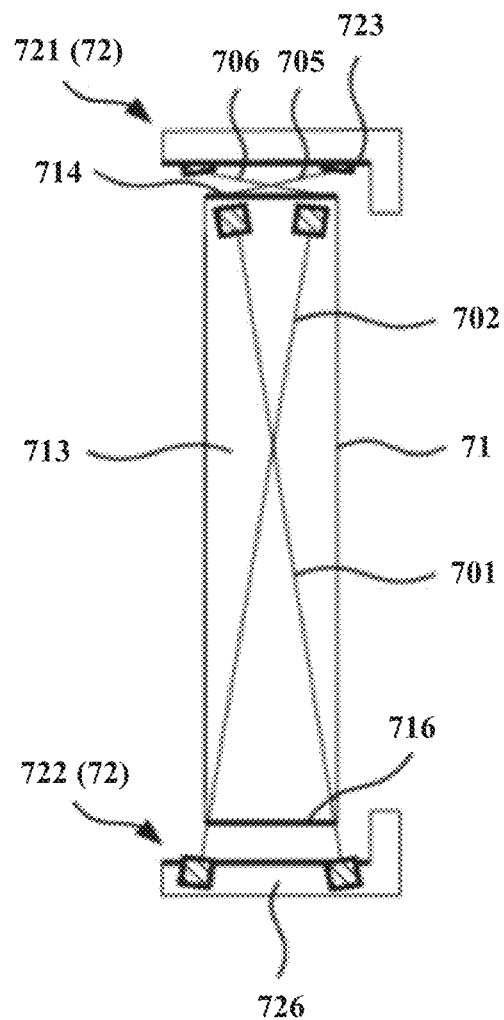
FIG. 13 is a main view of a motor according to an embodiment of this application.
Figure 14:
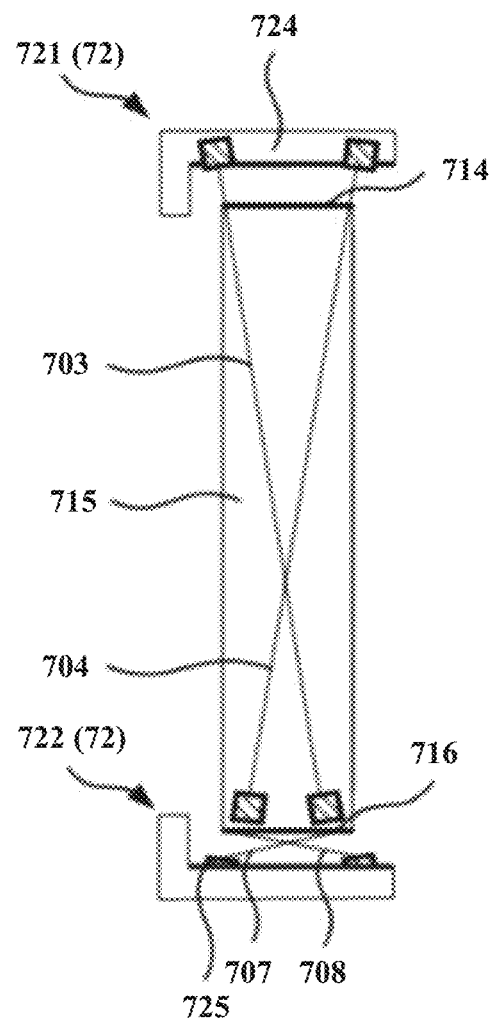
FIG. 14 is a rear view of a motor according to an embodiment of this application.

Refer to FIG. 12, FIG. 13, and FIG. 14. FIG. 12 is a schematic diagram of a manner of connection between a carrier and eight wires according to an embodiment of this application. FIG. 13 is a main view of a motor according to an embodiment of this application. FIG. 14 is a rear view of a motor according to an embodiment of this application. In some embodiments, first ends of the first wire 701 and the second wire 702 are separately connected to positions on the third surface 713 that are close to the first edge 717, second ends of the first wire 701 and the second wire 702 each are connected to the fourth sidewall 726, and projections of the first wire 701 and the second wire 702 onto the third surface 713 cross each other. It can be understood that, to make forces applied to the carrier 71 more even, the first end of the first wire 701 may be connected to a side that is on the third surface 713 and that is close to the first surface 711, and the first end of the second wire 702 may be connected to a side that is on the third surface 713 and that is close to the second surface 712. In other words, the first ends of the first wire 701 and the second wire 702 are separately connected to positions at two inner angles of the third surface 713 that are close to the first edge 717.

First ends of the third wire 703 and the fourth wire 704 are separately connected to positions on the fifth surface 715 that are close to the second edge 718, second ends of the third wire 703 and the fourth wire 704 each are connected to the second sidewall 724, and projections of the third wire 703 and the fourth wire 704 onto the fifth surface 715 cross each other. To make forces applied to the carrier 71 more even, the first end of the third wire 703 may be connected to a side that is on the fifth surface 715 and that is close to the first surface 711, and the first end of the fourth wire 704 may be connected to a side that is on the fifth surface 715 and that is close to the second surface 712. In other words, the first ends of the third wire 703 and the fourth wire 704 are separately connected to positions at two inner angles of the fifth surface 715 that are close to the second edge 718.

First ends of the fifth wire 705 and the sixth wire 706 are separately connected to positions on the fourth surface 714 that are close to the first edge 717, second ends of the fifth wire 705 and the sixth wire 706 each are connected to the first sidewall 723, and projections of the fifth wire 705 and the sixth wire 706 onto the fourth surface 714 cross each other. Similarly, the first ends of the fifth wire 705 and the sixth wire 706 may be separately connected to positions at two inner angles of the fourth surface 714 that are close to the first edge 717.

First ends of the seventh wire 707 and the eighth wire 708 are separately connected to positions on the sixth surface 716 that are close to the second edge 718, second ends of the seventh wire 707 and the eighth wire 708 each are connected to the third sidewall 725, and projections of the seventh wire 707 and the eighth wire 708 onto the sixth surface 716 cross each other. Similarly, the first ends of the seventh wire 707 and the eighth wire 708 may be separately connected to positions at two inner angles of the sixth surface 716 that are close to the second edge 718.

It can be learned that, in the foregoing implementation solution, each pair of the first wire 701 and third wire 703, the second wire 702 and fourth wire 704, the fifth wire 705 and seventh wire 707, and the sixth wire 706 and eighth wire 708 uses a center of the carrier 71 as a center of symmetry, and is disposed in a form of central symmetry. In a stable state, resultant forces applied to the carrier 71 can be mutually balanced, so that the carrier 71 can be reliably suspended between the first bracket 721 and the second bracket 722 through the eight wires.

It should be noted that, to improve reliability of connection between each wire and the carrier 71 and between each wire and the bracket 72, in this embodiment of this application, the motor further includes fixing sheets 73 disposed at the first end and the second end of each wire. In this way, the two ends of the wire can be connected to the carrier 71 and the bracket 72 respectively by the fixing sheets 73, so as to improve strength of connection between the wire and the carrier and between the wire and the bracket, thereby improving structural reliability of the motor.

As described above, the motor provided in this embodiment of this application may drive the lens group to move, so as to implement auto-focus and optical image stabilization functions. The following describes a driving principle of the motor in detail.

In some embodiments, the eight wires of the motor are separately retractable wires, so that statuses of forces applied to the carrier can be adjusted by controlling retracting statuses of the eight wires separately, so as to make the carrier move accordingly. In this embodiment of this application, to reduce difficulty of implementing retractable performance of the wires, the eight wires each may be prepared from a shape-memory alloy. The shape-memory alloy is a generic term for a type of metal with a shape-memory effect. The shape-memory effect thereof is: when the shape-memory alloy is below a memory temperature, it may show one structural form; or when the shape-memory alloy is above a memory temperature, an internal crystal structure of the shape-memory alloy changes, making the shape-memory alloy deform, and in this case, the shape-memory alloy may show one structural form. In some embodiments, when the wire is below a memory temperature of the wire, it is in a relatively relaxed state, or when the wire is above a memory temperature of the wire, it is shortened in length, and shows a deformation state of "shrunk". In addition, it should be understood that, if the wire is in the relatively relaxed state, when subjected to a particular external force, it may also be stretched and deformed, so that a length of the wire increases. Therefore, the wire in this embodiment of this application may alternatively have a deformation state of "stretched".

To facilitate control on a temperature of the wire, the wire can be connected to an arranged heating circuit, so that the wire can be heated by energizing the wire, thereby causing the wire to shrink and deform. In some embodiments, heating circuits in one-to-one correspondence with the wires may be disposed on the substrate, and the wires are respectively connected to the corresponding heating circuits. Alternatively, in other embodiments of this application, the wires may be disposed in parallel in a same heating circuit.

Figure 15:
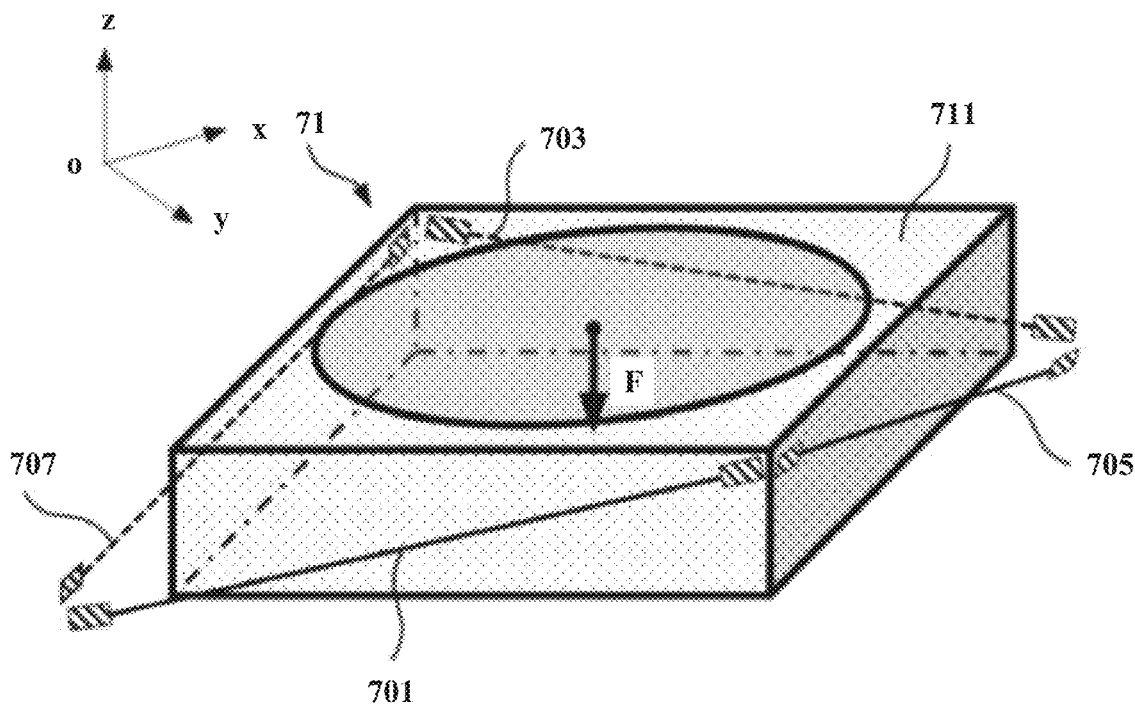
FIG. 15 is a schematic diagram of a carrier connected to a first wire, a third wire, a fifth wire, and a seventh wire.
Figure 16:
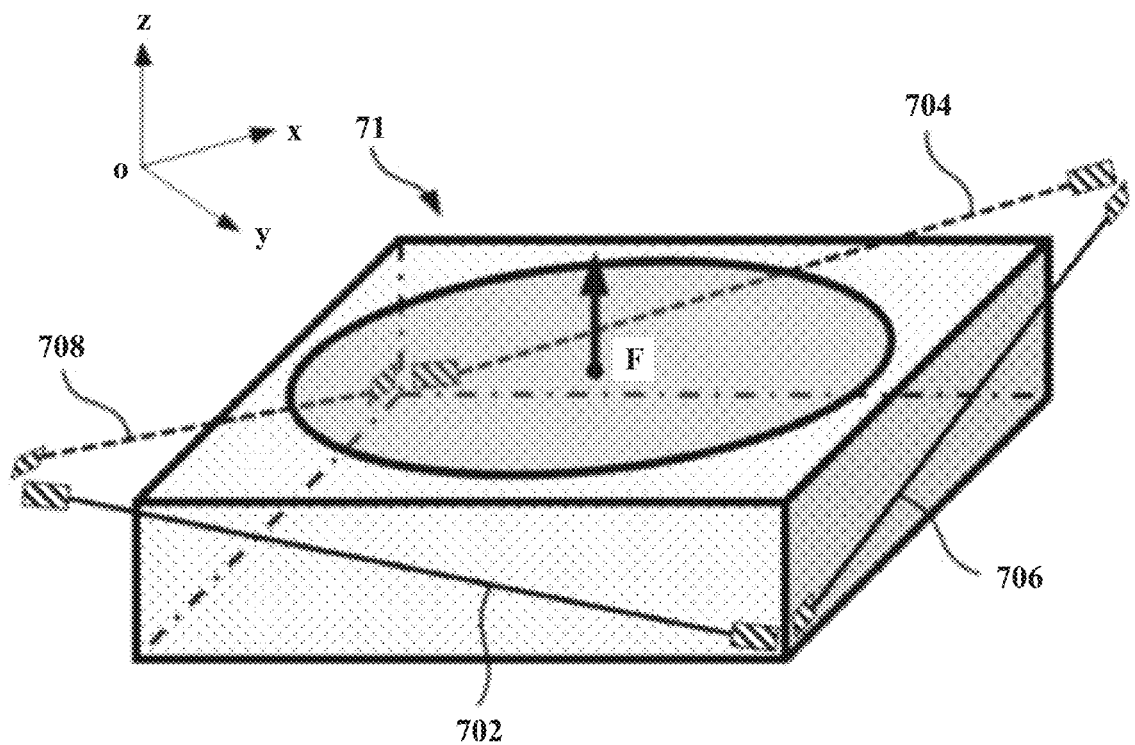
FIG. 16 is a schematic diagram of a carrier connected to a second wire, a fourth wire, a sixth wire, and an eighth wire.

Refer to FIG. 15 and FIG. 16. FIG. 15 is a schematic diagram of the carrier 71 connected to the first wire 701, the second wire 703, the fifth wire 705, and the sixth wire 707. FIG. 16 is a schematic diagram of the carrier 71 connected to the third wire 702, the fourth wire 704, the seventh wire 706, and the eighth wire 708. For ease of understanding, the remaining four wires are not shown. In addition, for ease of description, a three-dimensional coordinate system is established for the carrier 71, and two diagonal directions of the first surface 711 are respectively specified as an x-axis direction and a y-axis direction, and a direction perpendicular to the x-y plane is a z-axis direction (which is the third direction described above). Positive directions of the x-axis, y-axis, and z-axis are separately shown in the figure.

When the first wire 701, the third wire 703, the fifth wire 705, and the seventh wire 707 are energized, the four wires shrink and deform and can apply pulling forces to the carrier 71 along extension directions of the four wires. It can be learned, through force analysis, that a resultant force direction of the pulling forces generated by the four wires is a negative direction of the z-axis, and therefore the carrier 71 can be driven to translate in the negative direction of the z-axis. It should be noted that when the carrier 71 translates in the negative direction of the z-axis, the second wire 702, the fourth wire 704, the sixth wire 706, and the eighth wire 708 may be stretched and deformed to match translational movement of the carrier.

When the second wire 702, the fourth wire 704, the sixth wire 706, and the eighth wire 708 are energized, the four wires shrink and deform and can apply pulling forces to the carrier 71 along extension directions of the four wires. It can be learned, through force analysis, that a resultant force direction of the pulling forces generated by the four wires is a positive direction of the z-axis, and therefore the carrier 71 can be driven to translate in the positive direction of the z-axis.

Figure 17:
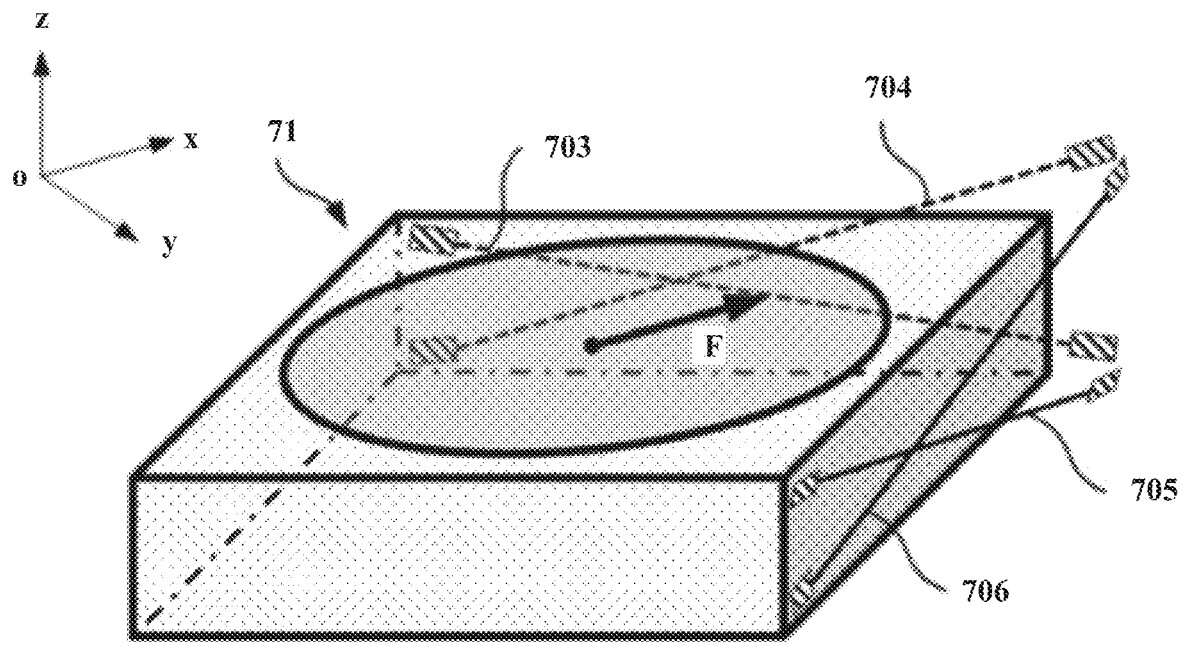
FIG. 17 is a schematic diagram of a carrier connected to a third wire, a fourth wire, a fifth wire, and a sixth wire.
Figure 18:
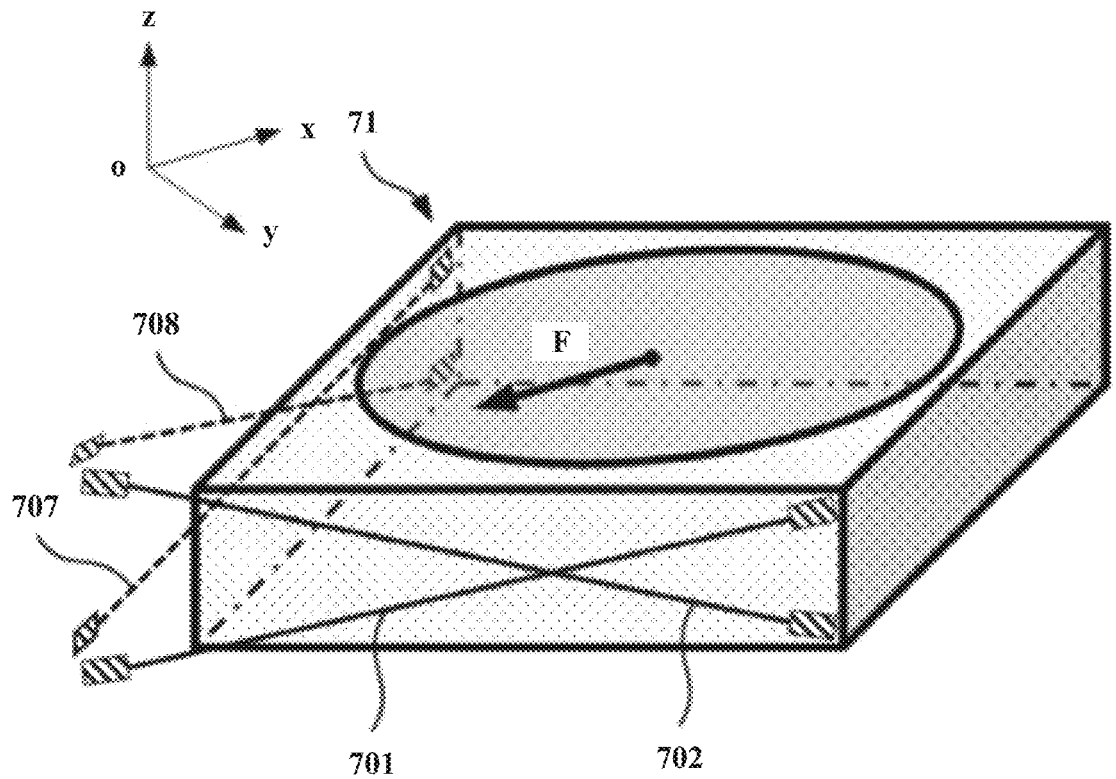
FIG. 18 is a schematic diagram of a carrier connected to a first wire, a second wire, a seventh wire, and an eighth wire.

Refer to FIG. 17 and FIG. 18. FIG. 17 is a schematic diagram of the carrier 71 connected to the third wire 703, the fourth wire 704, the fifth wire 705, and the sixth wire 706. FIG. 18 is a schematic diagram of the carrier 71 connected to the first wire 701, the second wire 702, the seventh wire 707, and the eighth wire 708.

When the third wire 703, the fourth wire 704, the fifth wire 705, and the sixth wire 706 are energized, the four wires shrink and deform, and a resultant force direction of pulling forces generated on the carrier 71 is a positive direction of the x-axis. Therefore, the carrier 71 can be driven to translate in the positive direction of the x-axis. When the first wire 701, the second wire 702, the seventh wire 707, and the eighth wire 708 are energized, the four wires shrink and deform, and a resultant force direction of pulling forces generated on the carrier 71 is a negative direction of the x axis. Therefore, the carrier 71 can be driven to translate in the negative direction of the x-axis.

Figure 19:
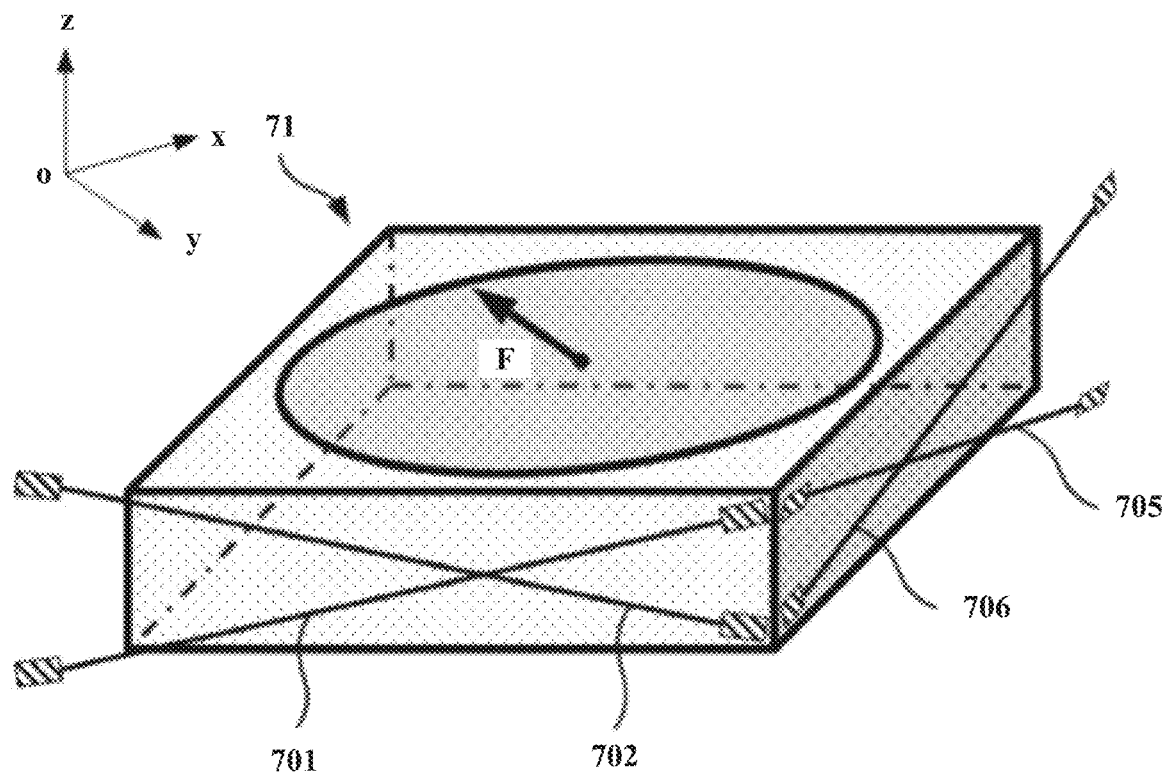
FIG. 19 is a schematic diagram of a carrier connected to a first wire, a second wire, a fifth wire, and a sixth wire.
Figure 20:
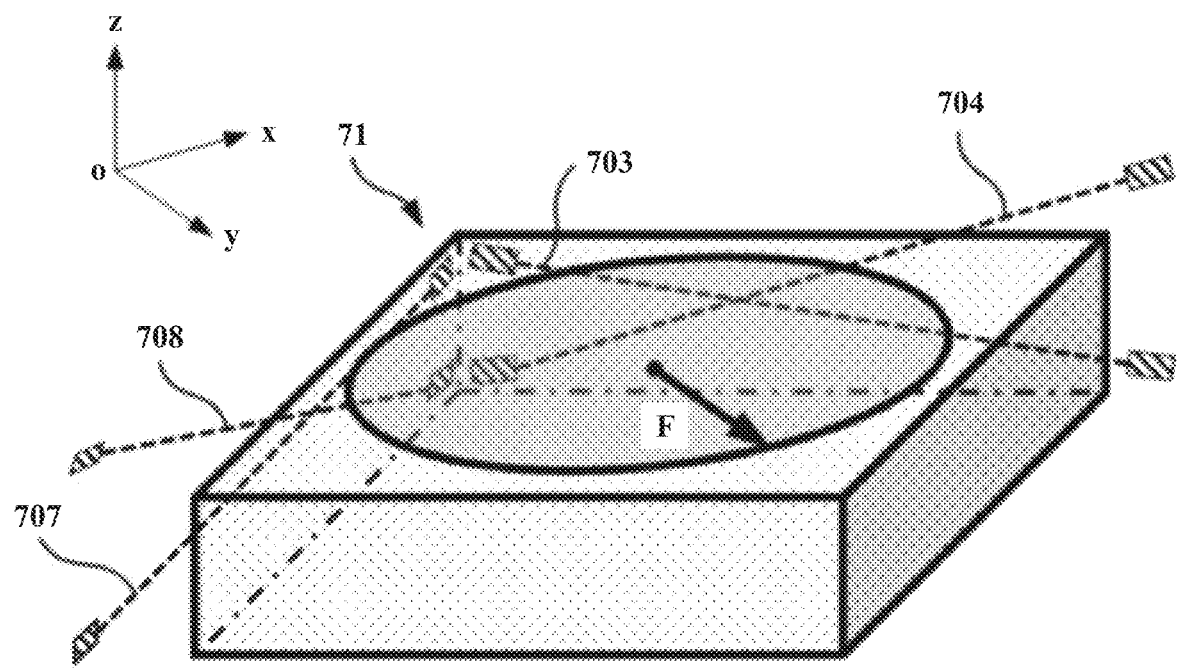
FIG. 20 is a schematic diagram of a carrier connected to a third wire, a fourth wire, a seventh wire, and an eighth wire.

Refer to FIG. 19 and FIG. 20. FIG. 19 is a schematic diagram of the carrier 71 connected to the first wire 701, the second wire 702, the fifth wire 705, and the sixth wire 706. FIG. 20 is a schematic diagram of the carrier 71 connected to the third wire 703, the fourth wire 704, the seventh wire 707, and the eighth wire 708.

When the first wire 701, the second wire 702, the fifth wire 705, and the sixth wire 706 are energized, the four wires shrink and deform, and a resultant force direction of pulling forces generated on the carrier 71 is a negative direction of the y axis. Therefore, the carrier 71 can be driven to translate in the negative direction of the y-axis. When the third wire 703, the fourth wire 704, the seventh wire 707, and the eighth wire 708 are energized, the four wires shrink and deform, and a resultant force direction of pulling forces generated on the carrier 71 is a positive direction of the y-axis. Therefore, the carrier 71 can be driven to translate in the positive direction of the y-axis.

Figure 21:
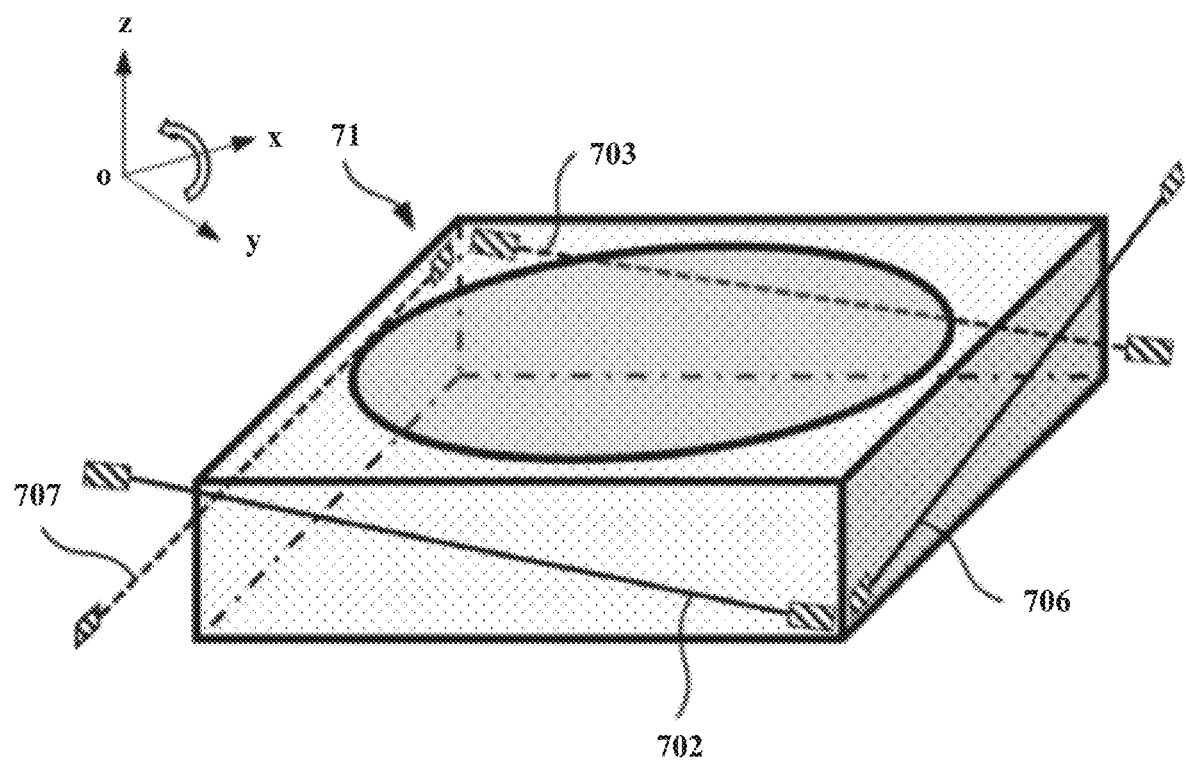
FIG. 21 is a schematic diagram of a carrier connected to a second wire, a sixth wire, a third wire, and a seventh wire.
Figure 22:
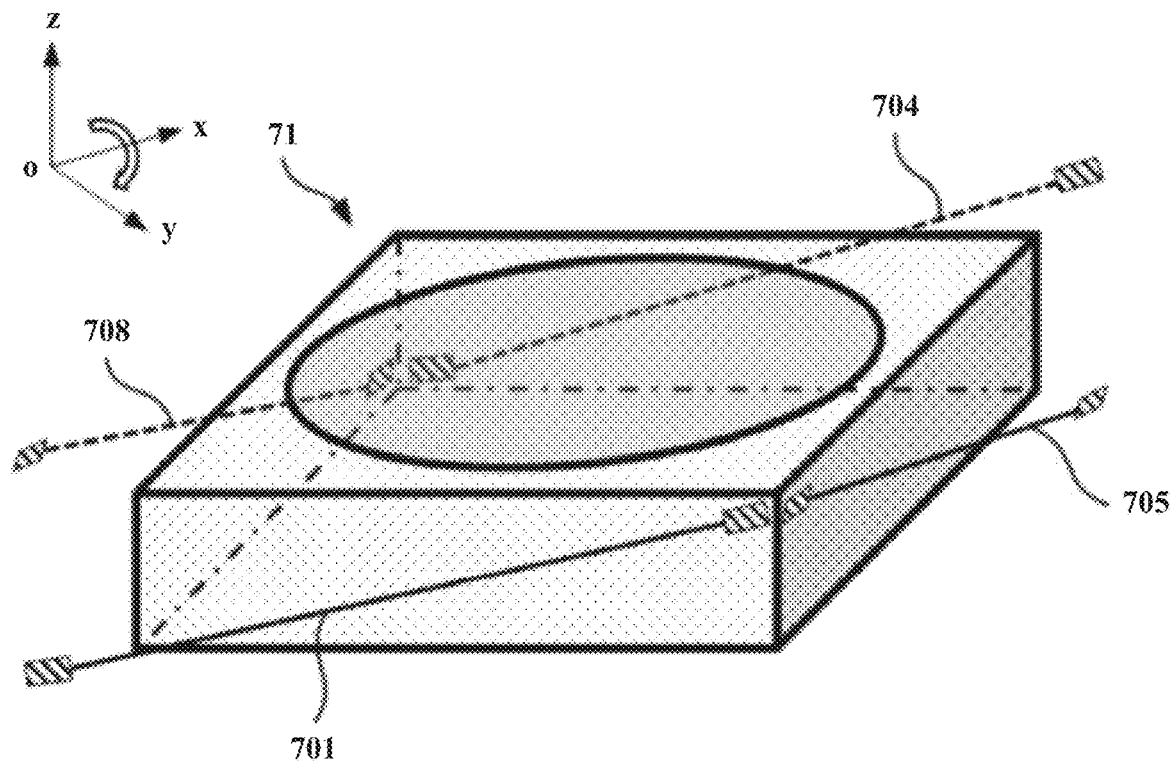
FIG. 22 is a schematic diagram of a carrier connected to a first wire, a fifth wire, a fourth wire, and an eighth wire.

Refer to FIG. 21 and FIG. 22. FIG. 21 is a schematic diagram of the carrier 71 connected to the second wire 702, the sixth wire 706, the third wire 703, and the seventh wire 707. FIG. 22 is a schematic diagram of the carrier 71 connected to the first wire 701, the fifth wire 705, the fourth wire 704, and the eighth wire 708.

When the second wire 702, the sixth wire 706, the third wire 703 and the seventh wire 707 are energized, the four wires shrink and deform, and a resultant force of pulling forces generated on the carrier 71 is a clockwise torque centered on the x-axis. Therefore, the carrier 71 can be driven to rotate clockwise around the x-axis. When the first wire 701, the fifth wire 705, the fourth wire 704, and the eighth wire 708 are energized, the four wires shrink and deform, and a resultant force of pulling forces generated on the carrier 71 is a counterclockwise torque centered on the x-axis. Therefore, the carrier 711 can be driven to rotate counterclockwise around the x-axis.

Figure 23:
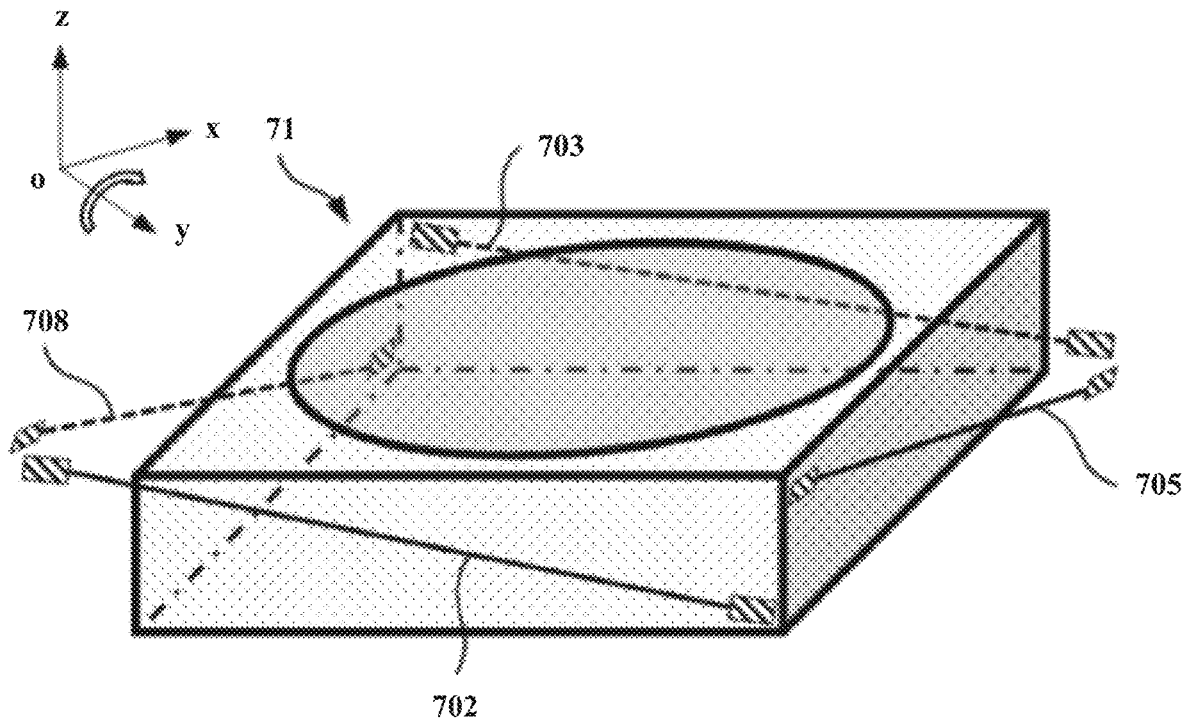
FIG. 23 is a schematic diagram of a carrier connected to a second wire, an eighth wire, a third wire, and a fifth wire.
Figure 24:
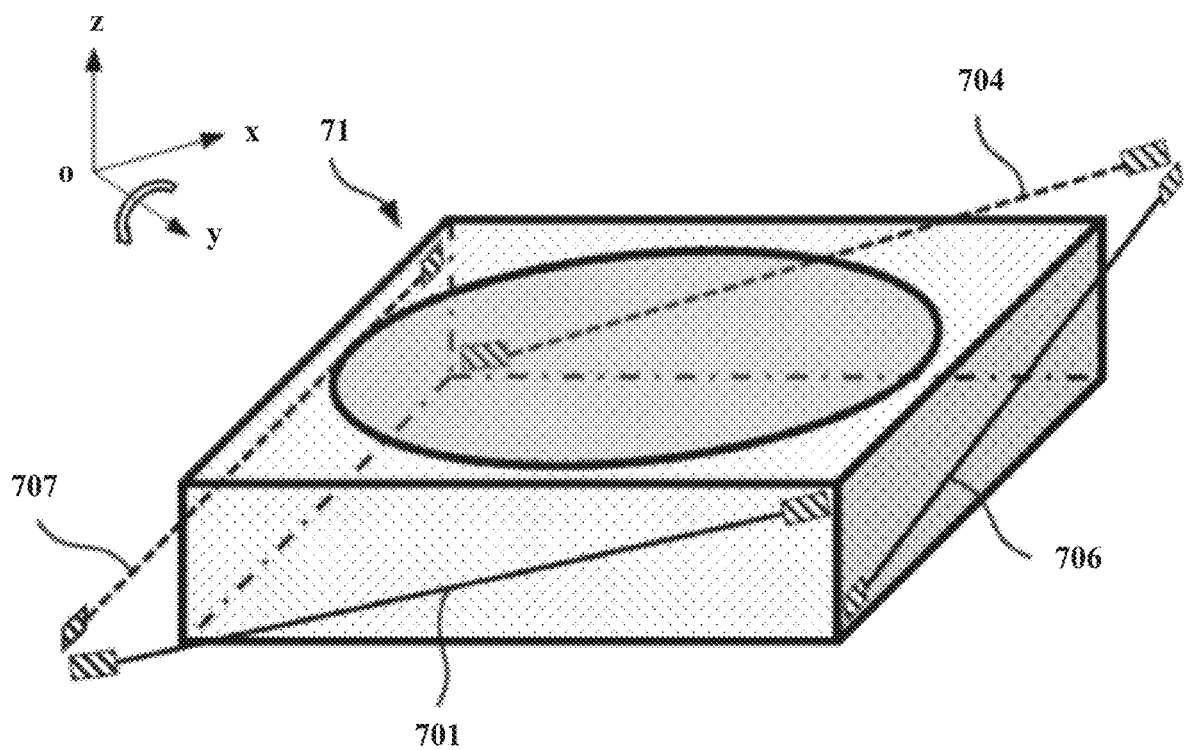
FIG. 24 is a schematic diagram of a carrier connected to a first wire, a seventh wire, a fourth wire, and a sixth wire.

Refer to FIG. 23 and FIG. 24. FIG. 23 is a schematic diagram of the carrier 71 connected to the second wire 702, the eighth wire 708, the third wire 703, and the fifth wire 705. FIG. 24 is a schematic diagram of the carrier 71 connected to the first wire 701, the seventh wire 707, the fourth wire 704, and the sixth wire 706.

When the second wire 702, the eighth wire 708, the third wire 703, and the fifth wire 705 are energized, the four wires shrink and deform, and a resultant force of pulling forces generated on the carrier 71 is a clockwise torque centered on the y-axis. Therefore, the carrier 71 can be driven to rotate clockwise around the y-axis. When the first wire 701, the seventh wire 707, the fourth wire 704, and the sixth wire 706 are energized, the four wires shrink and deform, and a resultant force of pulling forces generated on the carrier 71 is a counterclockwise torque centered on the y-axis. Therefore, the carrier 71 can be driven to rotate counterclockwise around the y-axis.

It can be learned through the analysis above that, by energizing corresponding wires of the motor, the carrier 71 can implement various motion forms such as translation along the z-axis direction, translation along the x-axis direction, translation along the y-axis direction, rotation around the x-axis direction, and rotation around the y-axis direction.

Figure 25:
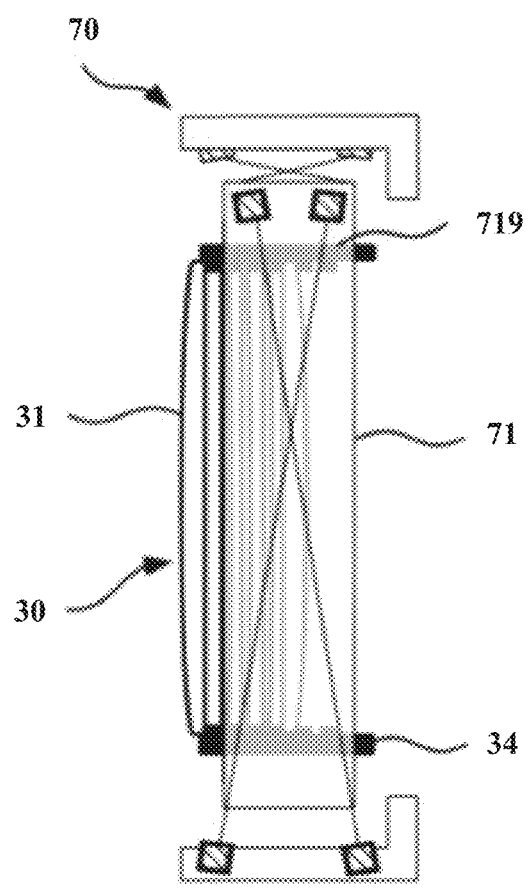
FIG. 25 is a schematic diagram of an assembled structure of a motor and a lens group according to an embodiment of this application.

Refer to FIG. 25. FIG. 25 is a schematic diagram of an assembled structure of a motor and a lens group according to an embodiment of this application. The lens group 30 may be disposed in the passage 719 of the carrier 71, so that the lens group 30 can be moved by moving the carrier 71.

FIG. 25 is a schematic diagram of an assembled structure of a lens group and a motor according to an embodiment of this application. The lens group 30 is disposed in the passage of the carrier 71, and when the lens group 30 includes the fixing base 34, the fixing base 34 may be fixed in the passage 719 in a manner such as an interference fit or clamping. Certainly, in other embodiments of this application, the fixing base 34 may alternatively be omitted, and a plurality of optical lenses 31 of the lens group 30 are directly fixed in the passage 719. This is not limited in this application.

In this way, when the carrier moves, the lens group can be driven to perform a same motion, which is, as follows:

When the first wire, the third wire, the fifth wire, and the seventh wire are energized, or the second wire, the fourth wire, the sixth wire, and the eighth wire are energized, the motor can drive the lens group to translate along the z-axis direction, so as to adjust a distance between the lens group and the image sensor. In this case, focusing in the z-axis direction can be implemented.

When the third wire, the fourth wire, the fifth wire, and the sixth wire are energized, or the first wire, the second wire, the seventh wire, and the eighth wire are energized, the motor can drive the lens group to translate along the x-axis direction. In this case, the imaging position on the surface of the image sensor can be adjusted in the x-axis direction, thereby implementing movable optical image stabilization in the x-axis direction.

When the first wire, the second wire, the fifth wire, and the sixth wire are energized, or the third wire, the fourth wire, the seventh wire, and the eighth wire are energized, the motor can drive the lens group to translate along the y-axis direction. In this case, the imaging position on the surface of the image sensor can be adjusted in the y-axis direction, thereby implementing movable optical image stabilization in the y-axis direction.

When the second wire, the sixth wire, the third wire, and the seventh wire are energized, or the first wire, the fifth wire, the fourth wire, and the eighth wire are energized, the motor can drive the lens group to rotate around the x-axis direction. In this case, the imaging position on the surface of the image sensor can be adjusted in the y-axis direction, thereby implementing tilting image stabilization centered on the x-axis.

When the second wire, the eighth wire, the third wire, and the fifth wire are energized, or the first wire, the seventh wire, the fourth wire, and the sixth wire are energized, the motor can drive the lens group to rotate around the y-axis direction. In this case, the imaging position on the surface of the image sensor can be adjusted in the x-axis direction, thereby implementing tilting image stabilization centered on the y-axis.

Therefore, by using the motor provided in this embodiment of this application, the camera module can implement focusing in the z-axis direction (which may also be referred to as image stabilization in the z-axis direction) and image stabilization in the x-axis and y-axis directions. In other words, a three-axis image stabilization function may be implemented by using one motor. Therefore, an overall structure of the camera module can be simplified, and manufacturing costs of the camera module can be reduced. In addition, because the structure of the camera module is simplified, a risk of failure can also be reduced.

It is worth mentioning that, in actual application, the motor may implement x-axis and y-axis dual-axis image stabilization in the movable optical image stabilization form, or may implement x-axis and y-axis dual-axis image stabilization in the tilting image stabilization form. This is not limited in this application.

Figure 26:
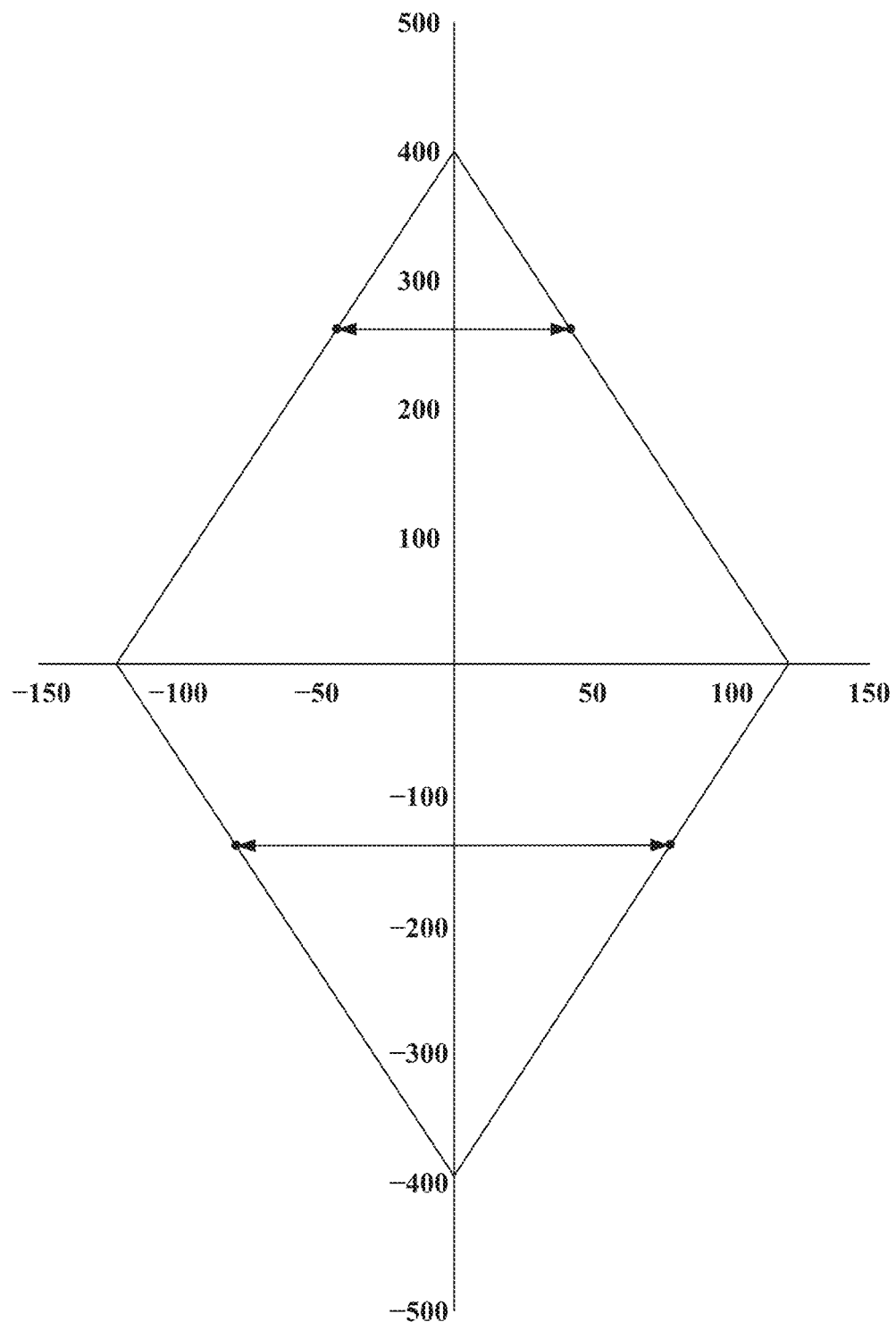
FIG. 26 is a characteristic diagram of focusing and image stabilization stroke capabilities of a motor.

In addition, it should be noted that a focusing capability of the motor provided in this embodiment of this application is associated with an image stabilization capability to some extent. Refer to FIG. 26. FIG. 26 is a characteristic diagram of focusing and image stabilization stroke capabilities of the motor. A direction of the horizontal coordinate axis indicates an image stabilization stroke of the motor, and the vertical coordinate axis indicates a focusing stroke of the motor. The image stabilization stroke herein may be understood as a stroke by which the motor can drive lens group to move in the x-axis direction or the y-axis direction. Similarly, the focusing stroke may be understood as a stroke by which the motor can drive the lens group to move in the z-axis direction. It can be learned that, in different focusing strokes, corresponding image stabilization strokes are different, and both meet a diamond contour relationship shown in the figure. Relative to the origin, a larger focusing stroke indicates a smaller image stabilization stroke, and when the focusing stroke is 0, the focusing stroke is the largest. Accordingly, when the image stabilization stroke is 0, the focusing stroke is the largest, and the largest focusing stroke may reach 800 micrometers or above.

Figure 27:
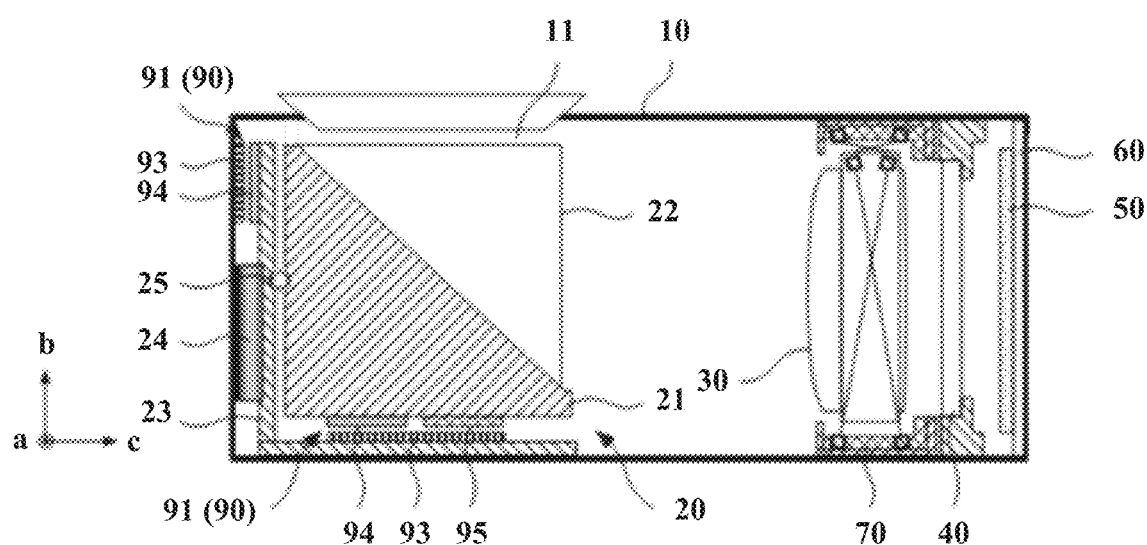
FIG. 27 is a schematic diagram of a structure of a camera module according to another embodiment of this application.

Based on this, an embodiment of this application additionally provides a camera module. Refer to FIG. 27. FIG. 27 is a schematic diagram of a structure of the camera module. The camera module includes a housing 10, and a light transfer part 20, a lens group 30, a light filter 40, an image sensor 50, and a substrate 60 disposed in the housing 10, as well as a motor 70 configured to drive the lens group 30 to drive. A relative position relationship between the components in the housing 10 may be consistent with those in the foregoing embodiment, and structures and arrangement manners of the lens group 30, the light filter 40, the image sensor 50, the substrate 60, and the motor 70 may also be consistent with those in the foregoing embodiment. Details are not described herein again. A difference lies in that the motor 70 in this embodiment of this application is mainly configured to implement a focusing function. Therefore, during design, an advantage of a large focusing stroke of the motor 70 may be utilized, and correspondingly, an image stabilization stroke of the motor 70 may be relatively small. Certainly, to maximize the focusing stroke of the motor 70, an image stabilization function of the motor 70 may be not considered during design. In other words, in some embodiments, the motor 70 in this embodiment of this application is configured to implement the focusing function.

In this embodiment of this application, the camera module may further include an image stabilization motor 90. The image stabilization motor 90 may drive the light transfer part 20 to rotate or translate, so as to implement tilting image stabilization or movable optical image stabilization of other two axes. The following describes in detail arrangement manners of the image stabilization motor 90 and the light transfer part 20 with the tilting image stabilization used for both the two axes.

Still refer to FIG. 27. The light transfer part 20 includes a support frame 21, a prism 22, and a base body 23. The base body 23 may be pivotally mounted on the housing 10 through a first rotating shaft 24, and the support frame 21 may be pivotally mounted on the base body 23 through a second rotating shaft 25. The prism 22 may be fixed to the support frame 21 in a manner such as bonding.

In some embodiments, an extension direction of the first rotating shaft 24 may be a b-axis direction, and an extension direction of the second rotating shaft 25 may be an a-axis direction. The image stabilization motor 90 includes a first driving component 91 and a second driving component 92. The first driving component 91 may be configured to drive the base body 23 to rotate around the b-axis, and the second driving component 92 may be configured to drive the support frame 21 to rotate around the a-axis. Each driving component includes a coil 93, and a first magnet 94 and a second magnet 95 that have opposite polarities. A first magnet 94 and a second magnet of the first driving component 91 may be disposed on a plane perpendicular to a c-axis direction on the base body 23, and the first magnet 94 and the second magnet are arranged along the a-axis direction on the plane (the second magnet is located on an inner side of the first magnet 94, and is not shown in the figure). The coil 93 is disposed on an inner wall of the housing 10 and is opposite to positions of the two magnets. When a current in one direction is input to the coil 93 to generate a polarity the same as that of the first magnet 94, the coil 93 repels the first magnet 94 and attracts the second magnet. In this case, the base body 23 and the support frame 21 and the prism 22 disposed on the base body 23 can be driven to rotate counterclockwise around the b-axis direction. When a current in the other direction is input to the coil 93 to generate a polarity the same as that of the second magnet, the coil 93 attracts the first magnet 94 and repels the second magnet. In this case, the base body 23 and the support frame 21 and the prism 22 disposed on the base body 23 can be driven to rotate clockwise around the b-axis direction.

Similarly, a first magnet 94 and a second magnet 95 of the second driving component 92 may be disposed on a plane perpendicular to the b-axis direction of the support frame 21, and the first magnet 94 and the second magnet 95 are arranged along the c-axis direction on the plane. The coil 93 is disposed on the base body 23 and opposite to positions of the two magnets. When a current in one direction is input to the coil 93 to generate a polarity the same as that of the first magnet 94, the coil 93 repels the first magnet 94 and attracts the second magnet 95. In this case, the support frame 21 and the prism 22 disposed on the support frame 21 can be driven to rotate clockwise around the a-axis direction. When a current in the other direction is input to the coil 93 to generate a polarity the same as that of the second magnet 95, the coil 93 attracts the first magnet 94 and repels the second magnet 95. In this case, the support frame 21 and the prism 22 disposed on the support frame 21 can be driven to rotate counterclockwise around the a-axis direction.

In other words, the first driving component 91 can drive the prism 22 to rotate around the a-axis direction, so as to adjust an imaging position on a surface of the image sensor 50 in the b-axis direction, thereby implementing b-axis tilting image stabilization. The second driving component 92 can drive the prism 22 to rotate around the b-axis direction, so as to adjust the imaging position on the surface of the image sensor 50 in the a-axis direction, thereby implementing a-axis tilting image stabilization.

In the foregoing embodiment, focusing and image stabilization functions of the camera module are respectively implemented by the motor 70 and the image stabilization motor 90. Therefore, the image stabilization stroke of the motor 70 may be not considered during design of the motor 70, so that an advantage of a large focusing stroke of the motor can be utilized, thereby improving long-focus performance of the camera module. In addition, because a structure of the motor 70 is simpler than that of a conventional voice coil motor, this solution can further simplify an overall structure of the camera module to some extent, thereby reducing manufacturing costs of the camera module.

It can be understood that the image stabilization motor may alternatively implement a-axis and b-axis image stabilization in a form of movable optical image stabilization. In this case, the base body can be assembled in the housing to be slidable along the a-axis direction, and the bracket can be assembled on the base body to be slidable along the b-axis direction. In some embodiments of the first driving component and the second driving component, each driving component may include a coil and a magnet. By properly arranging mounting positions of the coil and the magnet, and by using an adsorption force or a repelling force generated by the coil to the magnet when currents in different directions are received, the magnet drives the prism on the light transfer part to translate along the a-axis or the b-axis, so as to implement movable optical image stabilization in the a-axis direction and the b-axis direction.

Certainly, in other embodiments of this application, the image stabilization motor may alternatively implement a-axis image stabilization in a form of tilting image stabilization, and b-axis image stabilization in a form of movable optical image stabilization, or implement a-axis image stabilization in a form of movable image stabilization, and b-axis image stabilization in a form of tilting image stabilization, which may be specifically set according to actual requirements. This is not limited in this application.

Figure 28:
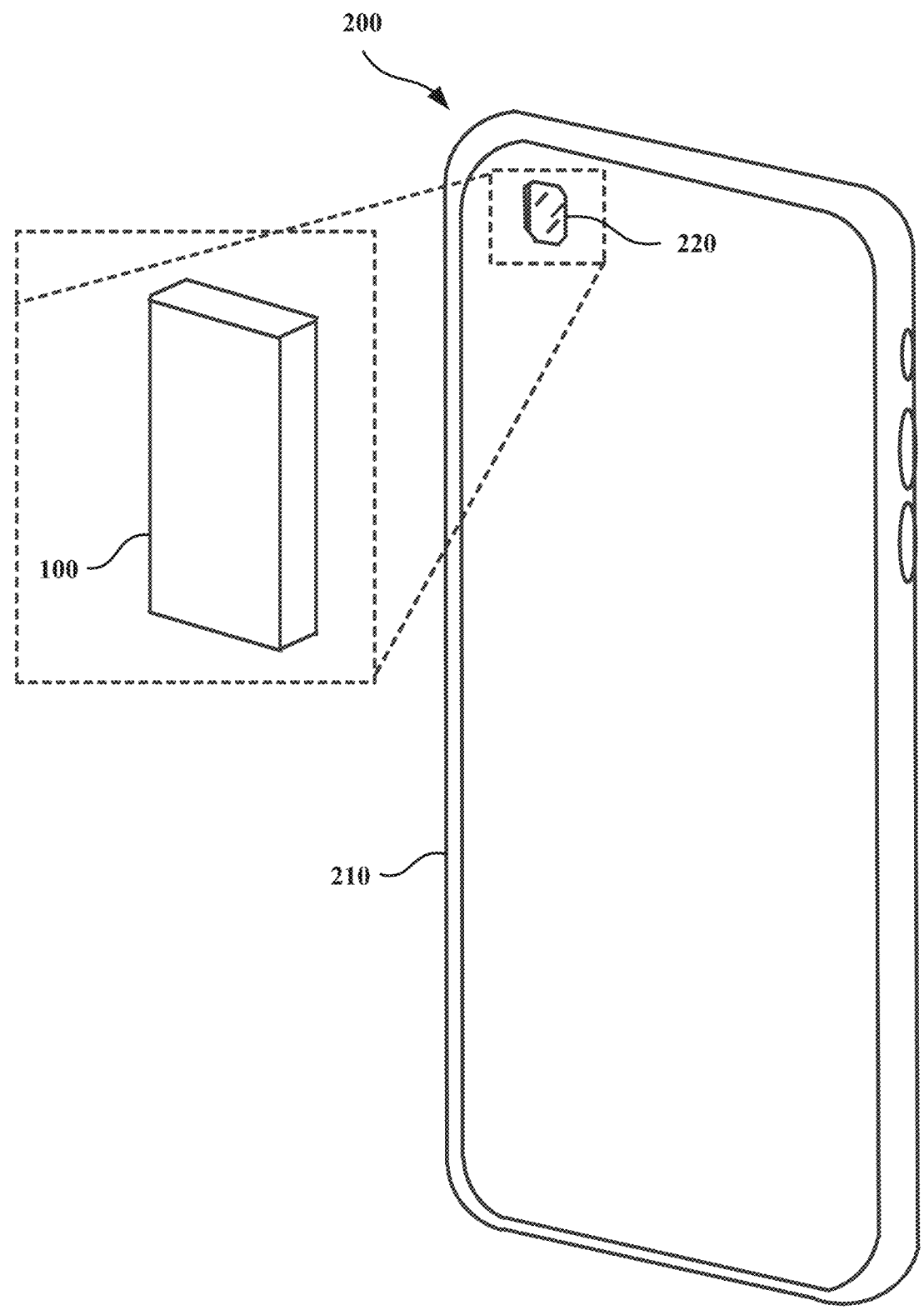
FIG. 28 is a schematic diagram of a structure of an electronic device according to an embodiment of this application.

Refer to FIG. 28. This application further provides an electronic device 200. The electronic device 200 may be a common terminal such as a mobile phone or a tablet computer in the conventional technology. The electronic device 200 includes a casing 210 and the camera module 100 in any one of the foregoing embodiments. The camera module 100 is disposed in the casing 210, and an opening 220 is disposed at a position that is on the casing 210 and that corresponds to a light inlet of the camera module 100. A light ray may enter the camera module 100 through the opening 220. Because manufacturing costs and reliability risks of the camera module 100 can be reduced, overall manufacturing costs of the electronic device 200 can also be reduced, and overall performance can be improved.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A camera module, comprising a housing, and a light transfer part, a lens group, an image sensor, and a motor disposed in the housing, wherein:
    the housing comprises a light inlet;
    the lens group is located between the light transfer part and the image sensor and comprises a light input side and a light output side;
    the light transfer part is located on a side of the light input side, and the light transfer part is disposed at the light inlet and is configured to redirect a light ray incident through the light inlet to enter the light input side;
    the image sensor is located on a side of the light output side; and
    the motor comprises a bracket, a carrier, and eight wires, wherein two ends of each of the eight wires are respectively connected to the carrier and the bracket, and each of the eight wires is retractable in length; and the carrier is suspended from the bracket using the eight wires and is configured to carry the lens group, and, when one or more of the eight wires extends or retracts in length, drive the lens group to translate or rotate, so as to adjust a position of the lens group relative to the image sensor.

2. The camera module according to claim 1, wherein each of the eight wires comprises a first end and a second end, the first end is connected to the carrier, and the second end is connected to the bracket; and
    the motor further comprises a fixing sheet for fixing the first end of one or more of the eight wires onto the carrier; and/or the motor further comprises a fixing sheet for connecting the second end of one or more of the eight wires to the bracket.

3. The camera module according to claim 1, wherein the carrier comprises a hexahedral structure and comprises a first surface and a second surface opposite to each other, and a third surface, a fourth surface, a fifth surface, and a sixth surface that are connected between the first surface and the second surface, wherein the third surface is opposite to the fifth surface, the fourth surface is opposite to the sixth surface, the third surface intersects with the fourth surface at a first edge, and the fifth surface intersects with the sixth surface at a second edge;
    the first surface is disposed facing the light transfer part, a passage passing through the first surface and then the second surface is disposed on the carrier, and the lens group is disposed in the passage; and
    the eight wires are grouped in pairs to separately connect to the third surface, the fourth surface, the fifth surface, and the sixth surface.

4. The camera module according to claim 3, wherein the bracket comprises a first bracket and a second bracket, and the carrier is suspended between the first bracket and the second bracket using the eight wires;
    the first bracket is disposed on a side of the fourth surface and comprises a first sidewall and a second sidewall, the first sidewall is disposed opposite to the fourth surface, and the second sidewall goes beyond the fifth surface in a first direction;
    the second bracket is disposed on a side of the sixth surface and comprises a third sidewall and a fourth sidewall, the third sidewall is disposed opposite to the sixth surface, and the fourth sidewall goes beyond the third surface in the first direction; and
    the first direction is an arrangement direction of the third surface and the fifth surface.

5. The camera module according to claim 4, wherein the eight wires comprise a first wire, a second wire, a third wire, a fourth wire, a fifth wire, a sixth wire, a seventh wire, and an eighth wire, wherein
    first ends of the first wire and the second wire are separately connected to positions on the third surface that are adjacent the first edge, second ends of the first wire and the second wire each are connected to the fourth sidewall, and projections of the first wire and the second wire onto the third surface cross each other;
    first ends of the third wire and the fourth wire are separately connected to positions on the fifth surface that are adjacent the second edge, second ends of the third wire and the fourth wire each are connected to the second sidewall, and projections of the third wire and the fourth wire onto the fifth surface cross each other;
    first ends of the fifth wire and the sixth wire are separately connected to positions on the fourth surface that are adjacent the first edge, second ends of the fifth wire and the sixth wire each are connected to the first sidewall, and projections of the fifth wire and the sixth wire onto the fourth surface cross each other; and first ends of the seventh wire and the eighth wire are separately connected to positions on the sixth surface that are adjacent the second edge, second ends of the seventh wire and the eighth wire each are connected to the third sidewall, and projections of the seventh wire and the eighth wire onto the sixth surface cross each other.

6. The camera module according to claim 1, wherein the camera module further comprises a substrate, the substrate is disposed on a side of the image sensor that is away from the lens group, and a heating circuit is disposed on the substrate; and the eight wires are made of a shape-memory alloy, and the eight wires each are connected to the heating circuit.

7. The camera module according to claim 1, wherein the camera module further comprises a mounting base located between the light transfer part and the image sensor, the mounting base is fixed in the housing, and the motor is fixed on the mounting base.

8. The camera module according to claim 7, wherein the mounting base comprises a base and a cover plate, the cover plate is disposed on a side of the base that is away from the image sensor, to form an accommodation space for accommodating the motor, and the cover plate and the base each are provided with a through hole communicating with the accommodation space.

9. The camera module according to claim 1, wherein the light transfer part comprises a support frame and a prism, wherein the support frame is fixed in the housing, and the support frame has a mounting surface; and the prism is fixed on the mounting surface and comprises a light input surface and a light output surface, the light input surface is disposed facing the light inlet, and the light output surface is disposed facing the light input side of the lens group.

10. The camera module according to claim 9, wherein the light input surface and the light output surface are disposed orthogonal to each other.

11. The camera module according to claim 9, wherein a limiting member is disposed in the housing, and the limiting member abuts against the support frame and limits the support frame.

12. The camera module according to claim 11, wherein the support frame is a triangular prism structure, and two edges that are on the support frame and that are adjacent to the mounting surface respectively have a first extension portion and a second extension portion; and the limiting member comprises a first limiting member and a second limiting member, the first limiting member abuts against the first extension portion, and the second limiting member abuts against the second extension portion.

13. The camera module according to claim 11, wherein the support frame is a plate-shaped structure, and two ends of the support frame respectively have a first extension portion and a second extension portion; and the limiting member comprises a first limiting member and a second limiting member, the first limiting member abuts against the first extension portion, and the second limiting member abuts against the second extension portion.

14. An electronic device, comprising a casing and a camera module, wherein the camera module is disposed in the casing, and an opening is disposed at a position that is on the casing and that corresponds to a light inlet of the camera module;

the camera module comprises a housing, and a light transfer part, a lens group, an image sensor, and a motor disposed in the housing, wherein the housing comprises the light inlet;

the lens group is located between the light transfer part and the image sensor and comprises a light input side and a light output side;

the light transfer part is located on a side of the light input side, and the light transfer part is disposed at the light inlet and is configured to redirect a light ray incident through the light inlet to enter the light input side;

the image sensor is located on a side of the light output side; and the motor comprises a bracket, a carrier, and eight wires, wherein two ends of each of the eight wires are respectively connected to the carrier and the bracket, and each of the eight wires is retractable in length; and the carrier is suspended from the bracket using the eight wires and is configured to carry the lens group, and, when one or more of the eight wires extends or retracts in length, drive the lens group to translate or rotate, so as to adjust a position of the lens group relative to the image sensor.

15. A camera module, comprising a housing, and a light transfer part, a lens group, an image sensor, a motor, and an image stabilization motor disposed in the housing, wherein the housing comprises a light inlet;

the lens group is located between the light transfer part and the image sensor and comprises a light input side and a light output side;

the light transfer part is located on a side of the light input side, and the light transfer part is movably disposed at the light inlet and is configured to redirect a light ray incident through the light inlet to enter the light input side;

the image sensor is located on a side of the light output side;

the motor comprises a bracket, a carrier, and eight wires, wherein two ends of each of the eight wires are respectively connected to the carrier and the bracket, and each of the eight wires is retractable in length; and the carrier is suspended from the bracket using the eight wires and is configured to carry the lens group, and, when one or more of the eight wires extends or retracts, drive the lens group to translate, so as to adjust a distance between the lens group and the image sensor; and the image stabilization motor is connected to the light transfer part and is configured to drive the light transfer part to translate or rotate, so as to adjust a propagation path of a light ray emitted from the light transfer part to the lens group.

16. The camera module according to claim 15, wherein each of the eight wires comprises a first end and a second end, the first end is connected to the carrier, and the second end is connected to the bracket; and the motor further comprises a fixing sheet for fixing the first end of one or more of the eight wires onto the carrier; and/or the motor further comprises a fixing sheet for connecting the second end of one or more of the eight wires to the bracket.

17. The camera module according to claim 15, wherein the carrier comprises a hexahedral structure and comprises a first surface and a second surface opposite to each other, and a third surface, a fourth surface, a fifth surface, and a sixth surface that are connected between the first surface and the second surface, wherein the third surface is opposite to the fifth surface, the fourth surface is opposite to the sixth surface, the third surface intersects with the fourth surface at a first edge, and the fifth surface intersects with the sixth surface at a second edge;
- the first surface is disposed facing the light transfer part, a passage passing through the first surface and then the second surface is disposed on the carrier, and the lens group is disposed in the passage; and
- the eight wires are grouped in pairs to separately connect to the third surface, the fourth surface, the fifth surface, and the sixth surface.

18. The camera module according to claim 17, wherein the bracket comprises a first bracket and a second bracket, and the carrier is suspended between the first bracket and the second bracket using the eight wires;
- the first bracket is disposed on a side of the fourth surface and comprises a first sidewall and a second sidewall, the first sidewall is disposed opposite to the fourth surface, and the second sidewall goes beyond the fifth surface in a first direction;
- the second bracket is disposed on a side of the sixth surface and comprises a third sidewall and a fourth sidewall, the third sidewall is disposed opposite to the sixth surface, and the fourth sidewall goes beyond the third surface in the first direction; and
- the first direction is an arrangement direction of the third surface and the fifth surface.

19. The camera module according to claim 18, wherein the eight wires comprise a first wire, a second wire, a third wire, a fourth wire, a fifth wire, a sixth wire, a seventh wire, and an eighth wire, wherein
- first ends of the first wire and the second wire are separately connected to positions on the third surface that are adjacent the first edge, second ends of the first wire and the second wire each are connected to the fourth sidewall, and projections of the first wire and the second wire onto the third surface cross each other;
- first ends of the third wire and the fourth wire are separately connected to positions on the fifth surface that are adjacent the second edge, second ends of the third wire and the fourth wire each are connected to the second sidewall, and projections of the third wire and the fourth wire onto the fifth surface cross each other;
- first ends of the fifth wire and the sixth wire are separately connected to positions on the fourth surface that are adjacent the first edge, second ends of the fifth wire and the sixth wire each are connected to the first sidewall, and projections of the fifth wire and the sixth wire onto the fourth surface cross each other; and
- first ends of the seventh wire and the eighth wire are separately connected to positions on the sixth surface that are adjacent the second edge, second ends of the seventh wire and the eighth wire each are connected to the third sidewall, and projections of the seventh wire and the eighth wire onto the sixth surface cross each other.

20. The camera module according to claim 15, wherein the camera module further comprises a substrate, the substrate is disposed on a side of the image sensor that is away from the lens group, and a heating circuit is disposed on the substrate; and
- the eight wires are made of a shape-memory alloy, and the eight wires each are connected to the heating circuit.

* * * * *